(12) United States Patent  (10) Patent No.: US 7,738,515 B2
Spinelli et al.  (45) Date of Patent: *Jun. 15, 2010

(54) QUASI-CW UV LASER WITH LOW PEAK PULSE-POWER

(75) Inventors: Luis A. Spinelli, Sunnyvale, CA (US); Sergei V. Govorkov, Los Altos, CA (US); R. Russel Austin, Cool, CA (US)

(73) Assignee: Coherent, Inc., Santa Clara, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 12/138,042

(22) Filed: Jun. 12, 2008

(65) Prior Publication Data

US 2008/0240171 A1 Oct. 2, 2008

Related U.S. Application Data

(63) Continuation of application No. 11/715,633, filed on Mar. 8, 2007, now Pat. No. 7,400,658.

(51) Int. Cl.
*H01S 3/10* (2006.01)
(52) U.S. Cl. .............................. 372/21; 372/22; 372/700
(58) Field of Classification Search .................. 372/21, 372/22, 25, 30, 700
See application file for complete search history.

(56) References Cited

U.S. PATENT DOCUMENTS

| 5,448,417 | A | 9/1995 | Adams | 359/856 |
| 5,993,904 | A | 11/1999 | Boucher | 427/248.1 |
| 6,275,514 | B1 | 8/2001 | Katzir et al. | 372/25 |
| 6,535,531 | B1 | 3/2003 | Smith et al. | 372/25 |
| 6,590,911 | B1 | 7/2003 | Spinelli et al. | 372/22 |
| 6,967,977 | B2 | 11/2005 | Hasson | 372/30 |
| 7,035,012 | B2 | 4/2006 | Govorkov et al. | 359/618 |
| 7,130,321 | B2 | 10/2006 | Spinelli et al. | 372/22 |
| 7,400,658 | B1* | 7/2008 | Spinelli et al. | 372/22 |
| 2006/0216037 | A1 | 9/2006 | Wiessner et al. | 398/161 |

* cited by examiner

*Primary Examiner*—Armando Rodriguez
(74) *Attorney, Agent, or Firm*—Morrison & Foerster LLP

(57) ABSTRACT

Laser apparatus is disclosed in which fundamental-wavelength optical pulses delivered from a mode-locked laser resonator at a pulse-repetition frequency (PRF) are converted to harmonic-wavelength pulses in an optical delay loop. One example is disclosed in which the harmonic-wavelength pulses are delivered directly from the delay loop. Another example is disclosed in which the harmonic-wavelength pulses are divided by the delay loop into a number of temporally spaced-apart replicas thereof, and the delay loop delivers bursts of replicas of different one of the harmonic wavelength pulses at a burst-repetition frequency equal to or a multiple of the PRF of the resonator.

15 Claims, 16 Drawing Sheets

QUASI-CW UV LASER WITH LOW PEAK PULSE-POWER

PRIORITY

This application is a continuation of U.S. application Ser. No. 11/715,633, filed Mar. 8, 2007 now U.S. Pat. No. 7,400,658.

TECHNICAL FIELD OF THE INVENTION

The present invention relates in general to mode-locked lasers. The invention relates in particular to quasi-continuous-wave laser apparatus including a mode-locked laser delivering fundamental radiation that is externally frequency-converted by one or more optically nonlinear crystals

DISCUSSION OF BACKGROUND ART

Continuous wave (CW) and quasi-CW UV lasers have been successfully utilized in microelectronic fabrication operations, for example, for inspection of wafers, microcircuits and masks. An advantage of using UV wavelengths is that a spatial resolution can be achieved that is comparable to the feature size of circuits. A CW laser is preferable, as such a laser provides the highest average power, power which is necessary for high throughput of the operation, while exposing a sample being operated on to the lowest possible peak intensity. The lower peak intensity is desirable in order to reduce damage to the sample during the operation.

CW UV lasers having adequate average power (several Watts) are not commercially available. There are commercial UV lasers available that involve frequency converting the output of a so-called quasi-CW laser. Such a laser is a pulsed laser that operates at a very high pulse-repetition frequency (PRF), for example, greater than about 10 megahertz (MHz) and typically 50 or more MHz. The pulse repetition frequency can be sufficiently high that, in certain operations on certain targets, the pulsed radiation beam from such a laser can be regarded as a continuous beam. Lasers including neodymium (Nd) doped host crystals, in particular yttrium vanadate ($YVO_4$) or yttrium aluminum garnet (YAG) can be operated, mode-locked, at a PRF between 70 MHz and 120 MHz, with a pulse-duration of between about 10 and several 100 picoseconds. Such lasers have a fundamental output-wavelength of about 1064 nanometers (nm). This wavelength can be tripled, quadrupled, or quintupled by optically nonlinear crystals to provide, respectively, third-harmonic, fourth-harmonic, or fifth-harmonic, radiation, all of which are at UV-wavelengths. Having short (picosecond) pulses with relatively high peak-power facilitates frequency conversion into the UV range. By way of example, a Paladin™ (frequency-tripled Nd:$YVO_4$) model laser available from Coherent®, Inc. of Santa Clara, Calif., the assignee of the present invention, can provide, at a wavelength of 355 nm (the third-harmonic wavelength), an average power as high as about 8 Watts (W) at a PRF of about 80 MHz. Pulse-duration (FWHM) is about 15 picoseconds.

While a relatively high peak-power of fundamental-wavelength pulses is advantageous for frequency (wavelength) conversion of the fundamental radiation, a relatively high power for UV-radiation pulses so produced can be disadvantageous for reasons discussed above. An increased average power for the UV radiation pulses, however, would be advantageous for increased operation throughput.

One approach to reducing peak-power in the UV radiation is to increase the PRF of the frequency-converted pulses by using a pulse-dividing arrangement to divide an original pulsed beam into two or more new pulsed beams, temporally separated by a submultiple (one-half, one-third, one-fourth, etc) of the repetition period of the original pulsed beam, then recombine these new beams on a common path or on a target. The pulses in the recombined beam will have a fraction of the peak-power of pulses in the original beam but will be delivered at a higher (twice, three-times, four times) PRF than those in the original beam. The average power in the new beam will be the same as that in the original beam less any losses incurred in the dividing and recombining operations. Examples of this approach are described in U.S. Pat. No. 6,275,514. Pulses in such a recombined beam will also, however, have only a fraction of the energy of pulses in the original beam. This could be a problem in operations for which pulse energy must exceed a threshold value.

Another approach to reducing peak-power in pulses without significantly reducing energy in the pulses is to temporally "stretch" the pulses without effectively changing the pulse-repetition frequency. In this approach, an optical delay loop having a round-trip time on the order of the duration of the original pulse is used to divide an original pulse into a plurality of replica pulses temporally spaced apart, peak to peak, by about one or two pulse-durations of the original pulse. These replicas of the original pulse are recombined on a target or along a common path as discussed above. The close temporal spacing of the replica pulses provides that the effect of the replica pulses in most operations is the same as a single pulse having an energy equal to the sum of the energy in the replica pulses. It is for this reason that the combination of the replica pulses is usually referred to in the prior-art as a stretched pulse.

This pulse-stretching approach is commonly used to reduce peak-power in UV radiation pulses delivered by excimer lasers. Such pulses have a duration of between about 20 nanoseconds (ns) and 80 ns and are usually delivered at a PRF between 100 Hertz (Hz) and 5 kilohertz (kHz). Examples of this approach to stretching excimer-laser pulses are taught in U.S. Patent Publication No. 2006/0216037 and in U.S. Pat. No. 7,035,012, which are assigned to the assignee of the present invention. Examples are also taught in U.S. Pat. No. 6,535,531. Imaging delay loops described in these documents have a round-trip length of about 6 meters or greater, depending on the duration of pulses being stretched. In most examples described, reflective imaging optics "fold" the delay loops into a space having a length as short about one-fourth of the round-trip length Mode-locked lasers described above, however, provide pulses having a duration of only several picoseconds. A delay line in accordance with the teachings of the above-reference documents, for a 15-picosecond pulse, would be required to have a length of only about 4.5 millimeters. Making and aligning components for an imaging delay line of this short length is impractical. Accordingly, there is a need for a different approach to stretching multi-picosecond pulses from frequency-converted mode-locked lasers.

SUMMARY OF THE INVENTION

The present invention is directed to laser apparatus for providing quasi-CW harmonic-wavelength pulses of relatively high average power and relatively low peak-power. In one aspect, apparatus in accordance with the present invention comprises a laser-resonator arranged to deliver fundamental-wavelength optical pulses having a pulse-duration, the fundamental-wavelength optical pulses being temporally equispaced by a pulse-repetition period τ and delivered at a pulse-repetition frequency (PRF) equal to 1/τ. An optical delay loop including one or more optically nonlinear crystals is arranged to receive the fundamental-wavelength optical pulses. The optical delay loop is configured and arranged such that each fundamental-wavelength pulse is converted within the optical delay loop into a harmonic-wavelength pulse and further arranged to convert each of the harmonic-wavelength into a plurality of replicas thereof, with the replicas of each harmonic-wavelength pulse being temporally spaced apart by $\tau/N \pm \Delta\tau$, where N is an integer equal to or greater than 2 and $\Delta\tau$ is a about equal to or greater than the pulse-duration of fundamental-wavelength optical pulses. The optical delay loop being further arranged to deliver bursts of the harmonic-wavelength pulse-replicas at a burst-repetition frequency equal to the PRF of the fundamental-wavelength optical pulses multiplied by N, with each burst including replicas of different ones of the harmonic-wavelength optical pulses.

In another aspect of apparatus in accordance with the present invention fundamental-wavelength pulses from a laser resonator are delivered to an optical delay loop including a plurality of optically nonlinear crystals arranged such that two harmonic wavelength pulses are generated from every fundamental-wavelength pulse delivered to the optical delay loop. The harmonic wavelength pulses are delivered, temporally spaced-apart from the delay loop, such that harmonic-wavelength pulses are delivered from the delay loop at a PRF twice that on the fundamental-wavelength pulses. Other aspects of the invention will be evident to one skilled in the art from the detailed description of the invention presented hereinbelow.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
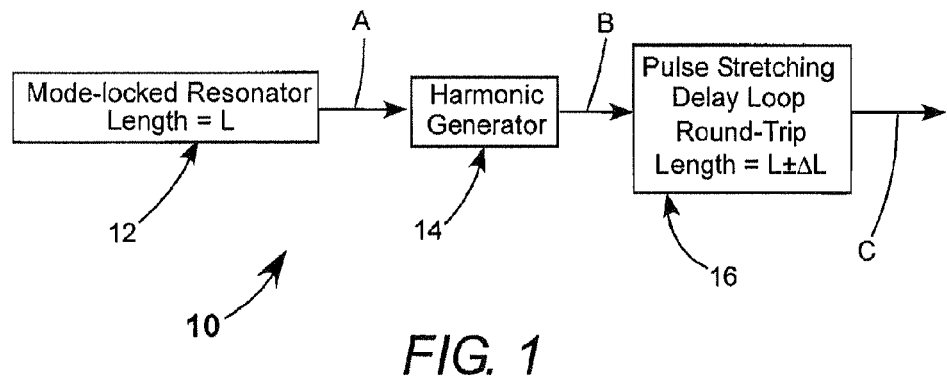
FIG. 1 schematically illustrates one preferred embodiment of laser apparatus in accordance with the present invention, including a mode-locked resonator having a resonator length and delivering optical pulses having a fundamental wavelength at a pulse-repetition period, a harmonic generator for converting the fundamental-wavelength pulses delivered by the laser-resonator to harmonic-wavelength pulses and a pulse-stretcher including an optical delay loop having a round-trip length fractionally different from twice the resonator length.

Referring now to the drawings, wherein like components are designated by like reference numerals, FIG. 1 schematically illustrates one preferred embodiment 10 of laser apparatus in accordance with the present invention. Apparatus 10 includes a mode-locked resonator 12 having a resonator (cavity) length L. It is emphasized that the length L, as defined here, is the round-trip length of the resonator, i.e., in a linear resonator having first and second end-mirrors, L is twice the distance from the first end-mirror to the second end-mirror. Length L is an optical round-trip length of the resonator and includes the effect of refractive index of a gain-medium (also not shown) and any other refractive optical elements therein.

Mode-locked resonator 12 delivers optical pulses having a fundamental wavelength at a pulse-repetition period τ. The pulse-repetition period is dependent on the optical length of the resonator and is equal to the round-trip time τ for fundamental radiation in the resonator, i.e., the round-trip length L divided by the speed of light. The pulse repetition frequency (PRF) of pulses delivered is, of course, 1/τ. The present invention is particularly useful when the PRF of the fundamental wavelength pulses is greater than about 10 MHz and the pulse-duration of the fundamental wavelength optical pulses is less than about 100 picoseconds.

In one example of the above-discussed Paladin™ laser, the PRF of the resonator is about 80 MHz, i.e., τ is about 12.5 nanoseconds (ns). The pulse-duration (FWHM) is about 15 picoseconds, i.e., τ is about 830 times the pulse-duration. As noted above, this laser generates pulses of third-harmonic (3H) radiation having a wavelength of about 355 nm from fundamental-wavelength pulses having a wavelength of about 1064 nm. For convenience of description, reference is made to this laser further in this description, but this should not be construed as limiting the invention to the particular structure or parameters of this mode-locked laser.

In apparatus 10, pulses of fundamental-wavelength radiation from resonator 12 are delivered to a harmonic generator 14 along path A. The harmonic generator converts the fundamental-wavelength pulses delivered by the laser-resonator to harmonic-wavelength pulses. Harmonic generator 14 may include only one optically nonlinear crystal arranged to generate pulses of second-harmonic radiation, or two or more optically nonlinear crystals arranged to generate pulses of third or higher harmonic-wavelength radiation as is known in the art.

Harmonic-radiation pulses from harmonic generator 10 are delivered along path B to a pulse stretching delay loop (pulse-stretcher) 16 in accordance with the present invention. An inventive aspect of this pulse-stretcher is that the delay loop thereof has as round-trip of L±ΔL, where ΔL is a relatively small fraction, for example, less than about one-hundredth of round-trip length L. In other words, the delay loop of stretcher 16 preferably has a round-trip delay time of τ±Δτ, where Δτ is on the order of a few pulse-durations, i.e., the round-trip delay time is fractionally greater than or less than a pulse-repetition period. A pulse-repetition period of 12.5 ns corresponds to a delay loop round-trip length of about 3.75 meters and a resonator length of about 1.875 meters. Prior-art pulse-stretchers of the type described in above referenced U.S. Pat. No. 7,035,012 have a delay time per round-trip that is only between one-half and a few pulse-durations.

Figure 2:
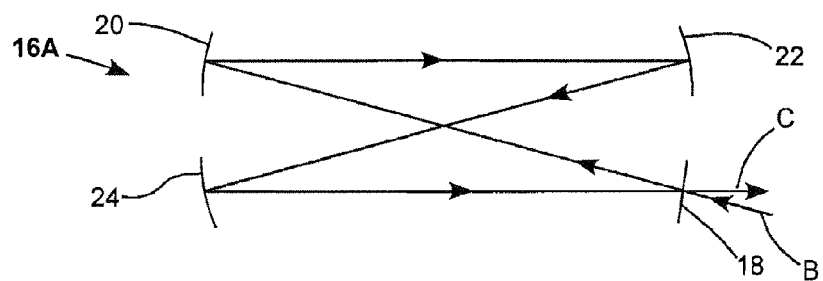
FIG. 2 schematically illustrates one example of an optical delay loop of the apparatus of FIG. 1, including three concave mirrors and a plane beamsplitter arranged and aligned to divide the harmonic-wavelength pulses into a plurality of temporally spaced-apart replicas following a common path in the delay loop and to recombine replicas of different ones of the harmonic-wavelength pulses along a common path in bursts thereof having a burst-duration much less than the pulse-repetition period of the mode-locked laser.

FIG. 2 schematically illustrates one example of an optical delay loop 16A suitable for use in the apparatus of FIG. 1. Delay loop 16A includes a beamsplitter 18 that is partially reflective and partially transmissive for the wavelength of harmonic-wavelength pulses generated by the harmonic generator of apparatus 10. Each of the harmonic-wavelength pulses is incident on beamsplitter 18, which reflects a portion (the first or prompt replica) of the pulse along path C and transmits the remainder of the pulse into the delay loop. In the delay loop, the remainder of the pulse is incident sequentially on concave mirrors 20, 22, and 24, which are preferably configured to image the remainder of the pulse 1:1, and preferably in the same orientation, back onto the beamsplitter at the original point of incidence. A portion of the remainder of the pulse is transmitted through the beamsplitter along path C as a second replica of the pulse and the remainder of that remainder goes around the delay loop again to provide third fourth, fifth etc. replicas until the pulse-replicas become vanishingly small and there is essentially nothing remaining of the pulse in the delay loop.

Relay imaging in delay loop 16A is at unit magnification (1:1) when mirrors 20 and 24 have the same focal length. Mirrors 20, 22, 24, and beamsplitter 18 are preferably separated by a distance approximately equal to $f_1+2f_2$. Where $f_1$ is the focal length of mirrors 20 and 24, and $f_2$ is the focal length of mirror 22. This ensures that a source in the plane of beamsplitter 18 is relay imaged onto the same plane after a complete roundtrip in delay loop 16A. Preferably $f_1$ is about equal to $2f_2$. This provides that the size of a circulating pulse (pulse-beam) is the same on all three mirrors and beamsplitter 18, and that focal points (waists) of the beam are located about mid-way between mirrors 20 and 22, and between mirrors 24 and 22.

The first replica of the pulse will have a relative (to the original pulse) peak-intensity (relative peak-power) R, where R is the reflectivity of the beamsplitter at the harmonic wavelength. The remaining (transmitted) replicas will have a relative power P(n) that can be approximated by an equation:

$$P(n)=(1-A)^{n-1}(1-R)^2 R^{n-2} \tag{1}$$

where A is the round-trip loss from scatter, absorption and the like, and n is the replica-number 2, 3, 4, and so forth. It can be determined from equation (1) that, in this loop configuration, the lowest peak relative power in a set (burst) of replicas of any one pulse will be obtained when the first and second replicas thereof have equal peak-power. The value of R required to establish this condition can be approximated by an equation:

$$R = \frac{2A - 3 + \sqrt{5-4A}}{2(A-1)} \tag{2}$$

By way of example, for a round-trip loss A of 0.02 R will be about 37.85%.

It can also be determined that whatever the peak-power of the first and second replicas, the third replica will have a peak-power less than either the first and second replicas. It can further be determined that the fourth and higher replicas will have a lower peak-power than the forgoing replica; and more than 99% of the maximum pulse energy obtainable, i.e., after round-trip losses, is contained in the first six replicas of any pulse. All pulse-replicas of any one pulse that are delivered by a delay loop are temporally spaced apart by τ±Δτ.

Figure 3:
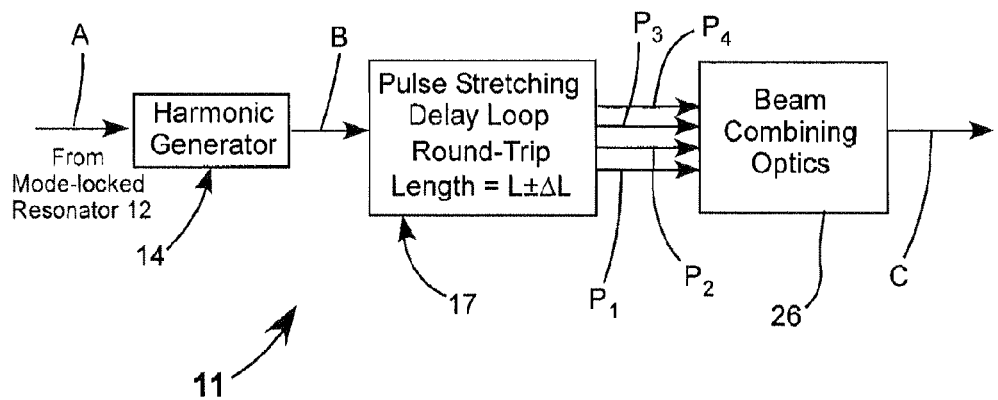
FIG. 3 schematically illustrates another preferred embodiment of laser apparatus in accordance with the present invention, similar to the apparatus of FIG. 1, but wherein the delay loop delivers the pulse-replicas along different paths and the apparatus further includes beam-combining optics for recombining the pulse-replicas on a common path or on a target.

FIG. 3 schematically illustrates another preferred embodiment 11 of laser apparatus in accordance with the present invention similar to apparatus 10 of FIG. 1 but wherein the delay loop 16 of apparatus 10 is replaced by a delay loop 17 that delivers a predetermined number (here four) of replicas of each pulse, with each replica delivered along a different path. The four paths are designated $P_1$, $P_2$, $P_3$, and $P_4$. Beam-combining optics 26 combine the replicas along a common path C as illustrated. Alternatively, beam-combining optics can be provided that focus the different replica paths at a common point on a target to which the replicas are being delivered. Various forms of beam-combining optics are known in the art to which the present invention pertains. As a detailed description of any such beam-combining optics is not necessary for understanding principles of the present invention, no such detailed description is presented herein.

Figure 4:
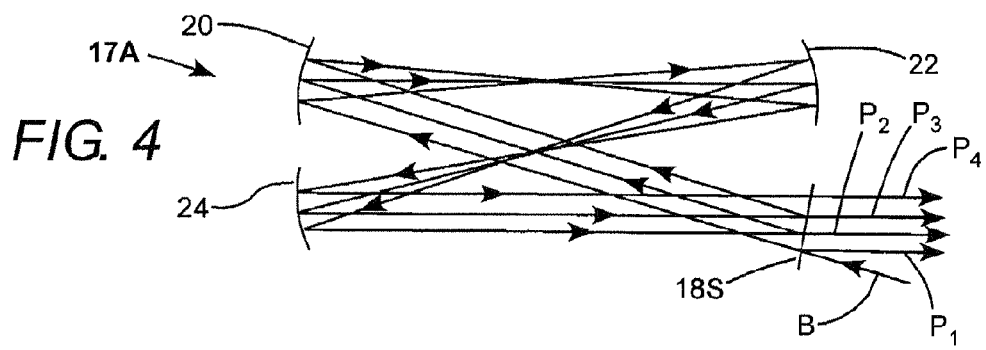
FIG. 4 schematically illustrates one example of an optical delay loop of the apparatus of FIG. 3, similar to the delay loop of FIG. 2, but wherein the three concave mirrors and the plane beamsplitter are misaligned such that the temporally spaced apart replicas follow different paths in the delay loop and exit the delay loop along different paths.

FIG. 4 depicts one example 17A of delay-loop 17. Delay loop 17A is similar to delay loop 16A of FIG. 2 with an exception that the beamsplitter and mirrors of the loop are misaligned from the alignment of FIG. 2 such that, after a first round trip in the loop, the remainder of the pulse is incident on the beamsplitter at a point thereon spaced apart from the point of entry. After a second and third round trips in the loop the remainder of the remainder of the pulse, and the remainder of the remainder of the remainder of the pulse, are incident on the beamsplitter at other spaced-apart points.

Figure 4A:
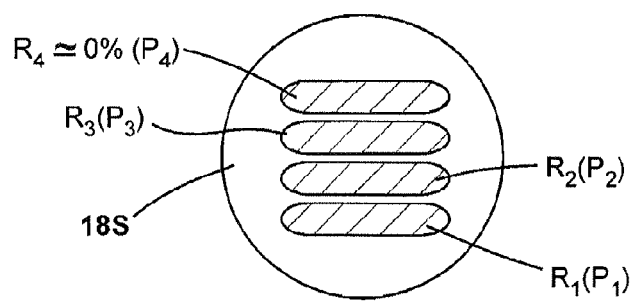
FIG. 4A schematically illustrates an example of the plane beam splitter in the delay loop of FIG. 4, the beamsplitter having zones of different reflectivity thereon corresponding to the different replica-paths in the delay loop.

Another exception is that beamsplitter 18 of loop 16A is replaced in loop 17A by a beamsplitter 18S, the reflectivity (and transmission) of which is graded or stepped over the beamsplitter such that reflectivity thereof is dependent on the location thereon of incident radiation. FIG. 4A schematically illustrates one example of reflective zones $R_1$, $R_2$, $R_3$, and $R_4$ on a beamsplitter 18S corresponding to the location thereon of paths $P_1$, $P_2$, $P_3$, and $P_4$, respectively. The paths are spaced apart and about parallel to each other. The reflectivity $R_4$ at the point of incidence on beamsplitter 18S after the third round trip is made as close to zero as possible. Alternatively, the beamsplitter can be configured such that after the third round trip the remaining pulse energy bypasses the beamsplitter altogether.

An advantage of this type of loop is that the reflectivity-grading or reflectivity-stepping of the beamsplitter can be selected such that each replica of any one pulse has about the same peak-power. A disadvantage is that beam quality on target will usually be less than optimum due to the separation of the replica paths. Delay loop 17A is only one example of a loop that can provide a predetermined number of replicas along a corresponding number of separate paths. Others are described in above-referenced U.S. Pat. No. 7,035,012, the complete disclosure of which is hereby incorporated by reference. Any of these loops can be operated in an aligned form as an "infinite" loop, such as loop 16A, with all replicas leaving the loop on a common path.

Figure 5:
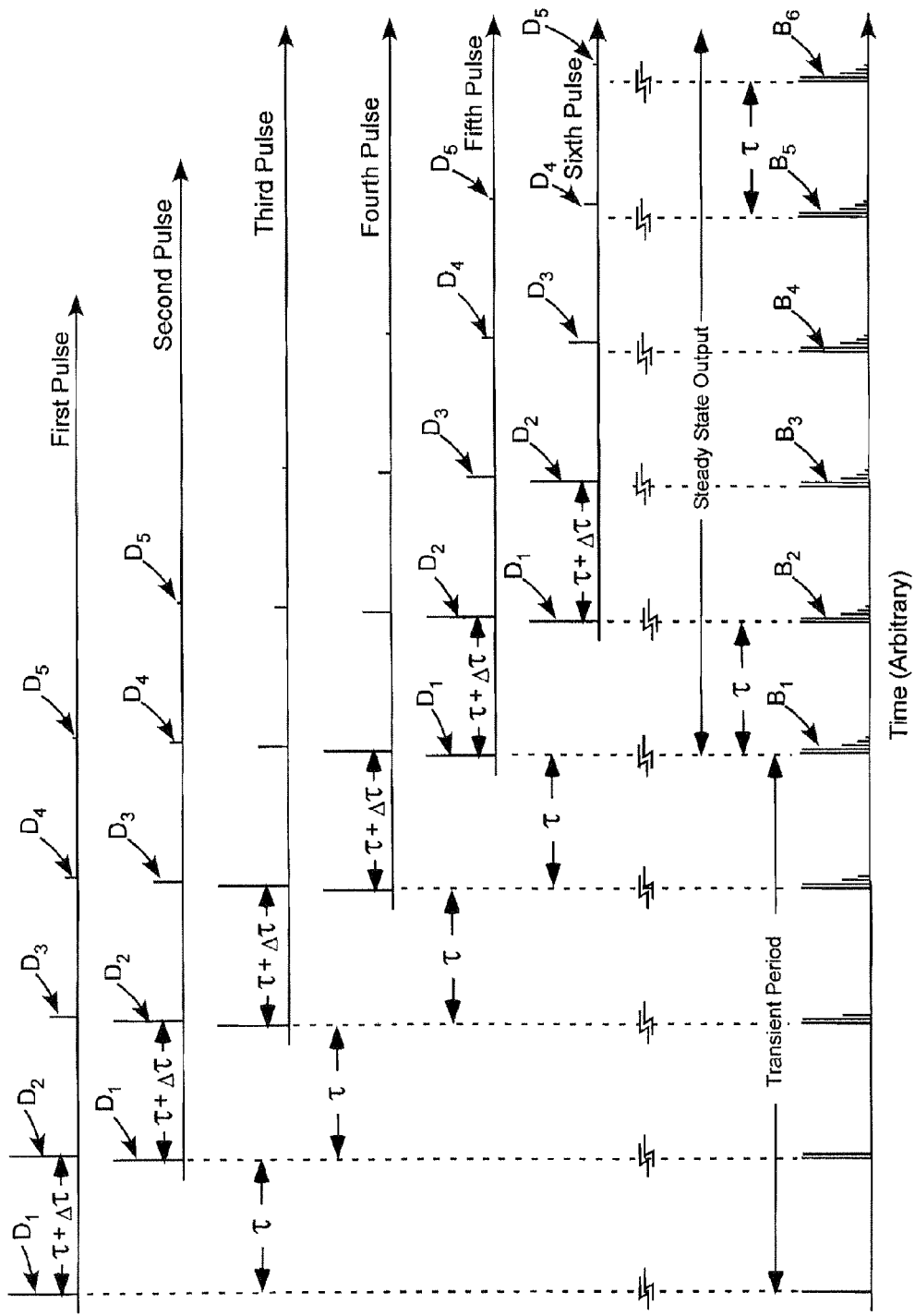
FIG. 5 is a timing diagram schematically illustrating division of harmonic-wavelength pulses into replicas thereof and recombination of replicas of different pulses into bursts thereof in a delay loop such as the delay loop of FIG. 2.

FIG. 5 is a timing diagram schematically illustrating division of harmonic-wavelength pulses into replicas thereof and recombination of replicas of different pulses into bursts thereof in a delay loop such as the delay loop of FIG. 2. The vertical axis in each line of the timing diagram is relative peak-power. The timing diagram is meant to represent operation of apparatus 10 immediately after the resonator begins to deliver pulses. The temporal development of replicas of the first through sixth pulses is depicted. Replicas $D_1$, $D_2$, $D_3$, $D_4$, and $D_5$ are depicted for each of the six pulses. Replicas D1 and D2 are assumed to have the same peak-power. In a delay loop 16A having a loss of 2% per round trip, this will occur when the reflectivity of beamsplitter 18 is about 37.9% and there is no second-surface reflection. Replicas $D_3$, $D_4$ and $D_5$ have progressively diminishing peak-power, and it is assumed that higher numbered replicas have a sufficiently low peak-power as to be negligible. By way of example for an input pulse of unit peak-power $D_1$, $D_2$, $D_3$, $D_4$, and $D_5$ will have relative peak values of about 0.379, 0.379, 0.140, 0.052, 0.019. The next replica would have a peak-power less than 1% of the input pulse. It is assumed that the round-trip delay in the resonator is $\tau \pm \Delta\tau$. Successive replicas of any one pulse are temporally spaced apart by this round-trip delay time. The first replica of any one pulse is temporally spaced apart from the first replica of an immediately previous pulse by the pulse-repetition period $\tau$.

It can be seen that there is a transient period of about 4 round-trip times until a burst $B_1$ of 5 replicas is output. The burst comprises, in time sequence, the first replica of the fifth pulse, the second replica of the fourth pulse, the third replica of the third pulse, the fourth replica of the second pulse, and the fifth replica of the first pulse, with the replicas spaced apart by $\Delta\tau$. Similar bursts will follow at intervals of $\tau$, i.e., the pulse-repetition period of pulses from the mode-locked resonator, with each burst comprising, in general, the sum of replicas $P_n(D_1)$, $P_{n-1}(D_2)$, $P_{n-2}(D_3)$, $P_{n-3}(D_4)$, $P_{n-4}(D_5)$ where Pn is the $n^{th}$ pulse, Pn−1 is the $(n-1)^{th}$ pulse and so forth.

It should be noted here that pulses from a mode-locked resonator are typically highly coherent, and replicas thereof will also be highly coherent. Accordingly, it is advisable to select a delay loop length such that $\Delta\tau$ is at least about one pulse-duration, and preferably at least two or three pulse-durations, to avoid optical interference between the pulse-replicas. With a replica separation of three pulse-durations, the effective burst-duration will be only about twelve pulse-durations, i.e., about 1.5% of a pulse-repetition period for 15-picosecond pulses at a PRF of 80 MHz. The term "effective", as used here, implies that the sixth and higher replicas of individual pulses have negligible contribution. The bursts of replicas will have an effect on a target of single, stretched pulses delivered at the PRF of the laser-resonator.

It should also be noted that if the length of the delay loop is selected such that the round-trip time therein is $\tau - \Delta\tau$, pulse-replicas in a burst will be in a temporal sequence that is the reverse of the sequence discussed above, i.e., $P_{n-4}(D_5)$, $P_{n-3}(D_4)$, $P_{n-2}(D_3)$, $P_{n-1}(D_2)$, and $P_n(D_1)$. This is not possible in a prior-art closed-loop pulse-stretcher wherein the round-trip time is on the order of a pulse-duration. Such a sequence can be used to "tailor" the energy-deposition temporal profile in pulse-bursts when two stretchers are "cascaded". Examples of this are presented further hereinbelow.

Figure 6:
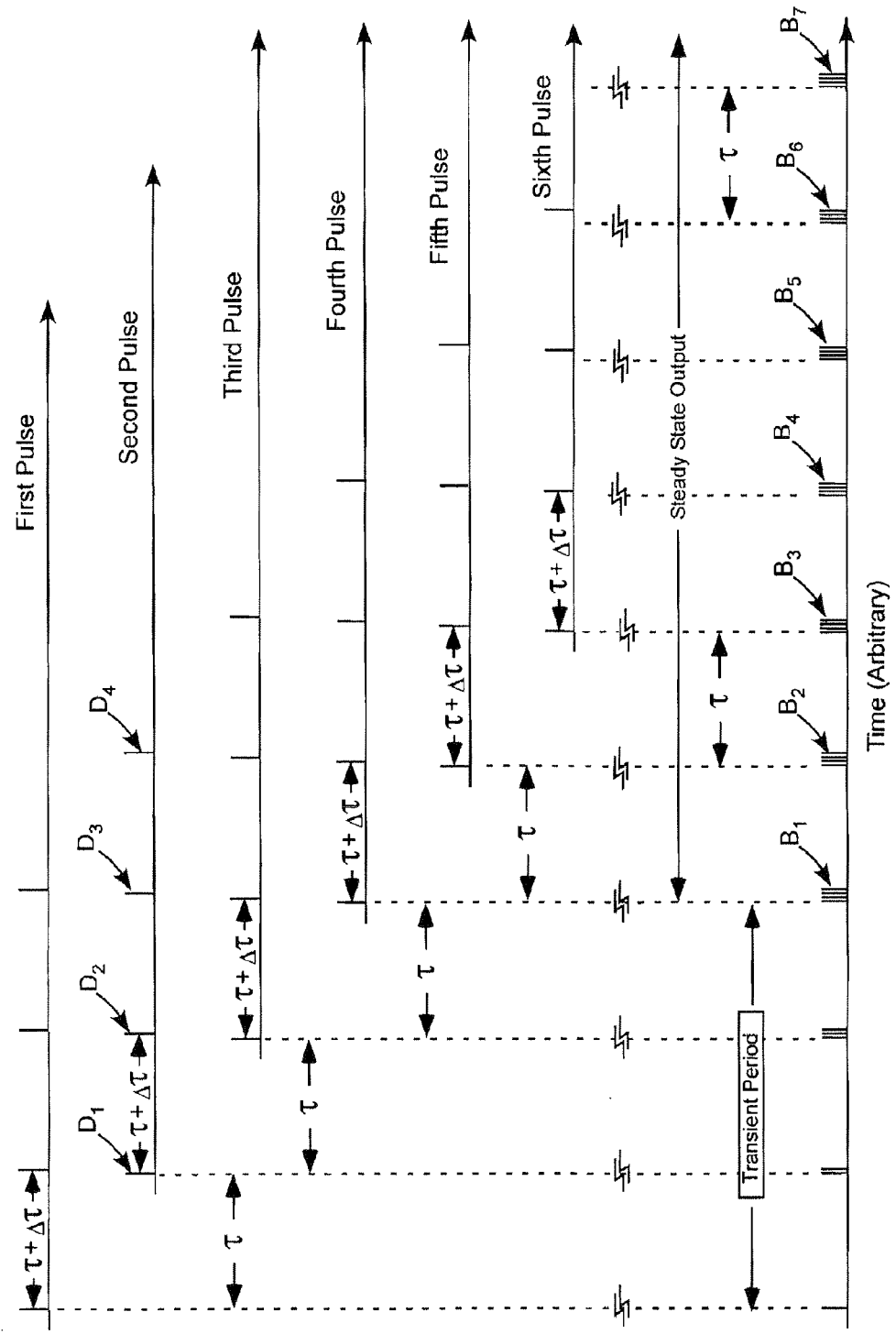
FIG. 6 is a timing diagram schematically illustrating division of harmonic-wavelength pulses into replicas thereof and recombination of replicas of different pulses into bursts thereof in a delay loop such as the delay loop of FIG. 4.

FIG. 6 is a timing diagram schematically illustrating division of harmonic-wavelength pulses into replicas thereof and recombination of replicas of different pulses into bursts thereof in a delay loop such as the delay loop of FIG. 4. In this example graded beamsplitter 18S of delay loop 17A (see FIG. 4) has been arranged such that only four replicas per pulse are created, all having the same peak-power. In this case, the temporal sequence of replicas in a burst is un-important. Whatever the temporal sequence, the energy deposition profile in a burst of replicas can be tailored by appropriate selection of stepped or graded reflectivity in the beamsplitter of the delay loop.

It is emphasized here that although the round-trip length of a delay loop in accordance with the present invention is only longer or shorter than that length required to provide a delay time equal to $\tau$ by a relatively small fraction, the fraction, in length units, is a few millimeters more or less than the round-trip length. This is very much greater than common manufacturing tolerances anticipated in constructing the loop or in variations in the loop length that might occur through environmental effects such as temperature variations or the like. In other words, the fractional difference is highly unlikely to occur by accident, and, in a properly constructed loop the length of the loop can be stabilized such that the fractional delay time $\Delta\tau$ does not vary significantly in normal use.

Figure 7:
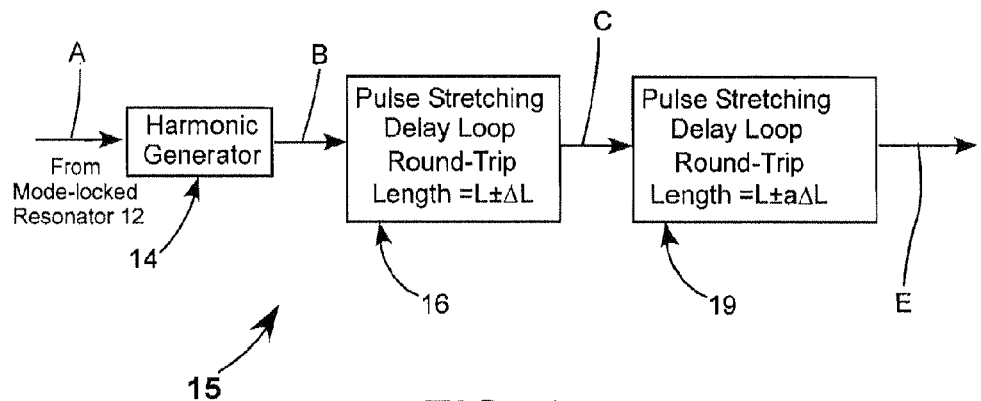
FIG. 7 schematically illustrates yet another preferred embodiment of laser apparatus in accordance with the present invention, similar to the apparatus of FIG. 1 but wherein bursts of pulses from the pulse-stretcher are delivered to a second pulse-stretcher having a round-trip length having a fractionally different length from twice the resonator length, the second pulse-stretcher arranged to divide first bursts of replica pulses from the first pulse-stretcher into a plurality of temporally spaced-apart replicas of the pulse-bursts following a common path in the delay loop and to recombine different ones of the first pulse-burst replicas along a common path in second bursts thereof having a burst-duration much less than the pulse-repetition period of the mode-locked laser, but having more replicas per burst, and a burst-duration longer than that of the first pulse-bursts.

FIG. 7 schematically illustrates yet another preferred embodiment 15 of laser apparatus in accordance with the present invention similar to the apparatus of FIG. 1, but wherein bursts of pulses from pulse-stretcher 16 are delivered along common path C to a second pulse-stretcher 19 having a round-trip length fractionally different from the round-trip resonator length and different from the round-trip length in pulse-stretcher 16. Pulse-stretcher 19 is arranged to divide bursts of replica pulses from pulse-stretcher into a plurality of temporally spaced-apart replicas of the pulse-bursts following a common path in the delay loop and to recombine different ones of the first pulse-burst-replicas along a common path E. Pulse-stretcher 19 outputs burst of replicas with each of the bursts having more replicas per burst than the input bursts and a longer burst-duration than the input bursts.

Figure 8:
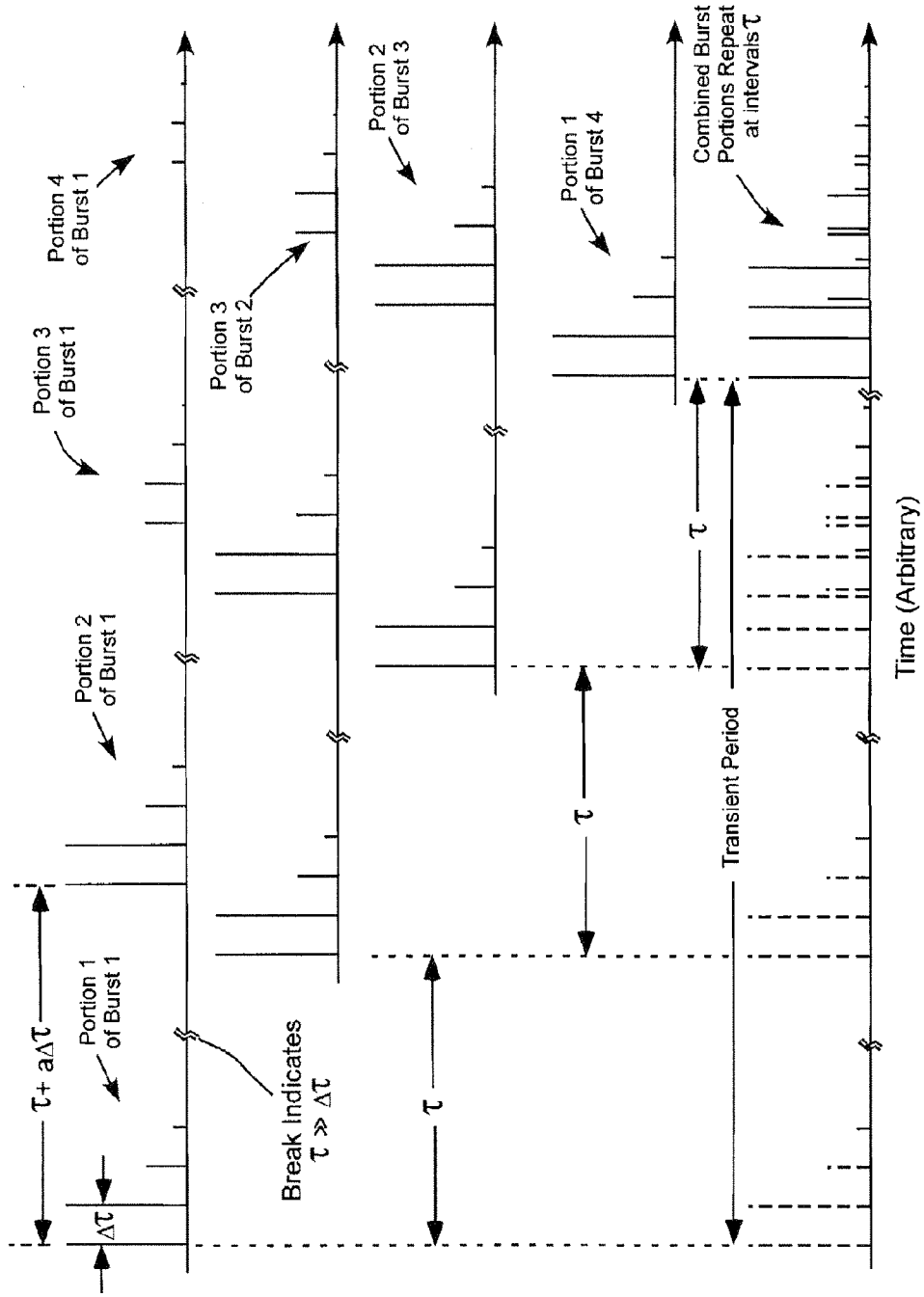
FIG. 8 is a timing diagram schematically illustrating division of bursts of harmonic-wavelength pulses into replicas thereof by an example of the second pulse-stretcher including a delay loop similar to the delay loop of FIG. 2, and recombination of replicas of different pulse-replica-bursts into longer bursts, with the first and second delay loops each have a round-trip length fractionally greater than twice the resonator-length of the mode-locked laser.

FIG. 8 is a timing diagram schematically illustrating division of bursts of harmonic-wavelength pulses into replicas thereof by an example of pulse-stretcher 19 including a delay loop similar to the delay loop of FIG. 2. In this example, the beamsplitter reflectivity of both pulse-stretchers is assumed to be that which will provide that the first two replicas of a pulse (in the case of first pulse-stretcher 16) or a burst thereof (in the case of first pulse-stretcher 19) have equal peak-power. Accordingly, the first two replica pulses in portions 1 and 2 of a first burst of pulse-replicas have a relative peak-power of about 0.143 with the first two replicas in subsequent portions scaling accordingly as depicted in the first line of FIG. 8.

The burst-portions are spaced apart by a time period $\tau + a\Delta\tau$, where a is selected (cooperative with the temporal spacing $\Delta\tau$ of replicas in a burst) according to a desired degree of temporal overlap of burst-portions at the output of pulse-stretcher 19, while still maintaining a preferred temporal spacing of at least two pulse-durations between any two replicas in the overlapping burst-portions. Here, after 4 pulse-bursts have been delivered into pulse-stretcher 19 from pulse-stretcher 16 (the first 4 lines of the timing diagram of FIG. 8) the output of pulse-stretcher 19 (the bottom line of the timing diagram of FIG. 8) will comprise, portion 1 of burst 4, portion 2 of burst three, portion 3 of burst two, and portion 4 of burst 1. The burst-portions are combined and temporally overlapped to form, in effect, a single burst of pulse-replicas. Similar combined burst-portions will be output from pulse-stretcher 19 at time intervals of $\tau$, i.e., at the PRF of the mode-locked laser.

The relative temporal position of replicas in a combined burst can be determined by tabling values of an expression:

$$x = (m-1)a + (n-1)b \quad (3)$$

for integer values 1 through m and 1 through n, where a and b are specified in pulse-durations, a is the separation of replicas in a burst and b is the separation of burst-portions in a combination thereof, n is the number of significant replicas in a burst and m is the number of significant burst-portions in a combination. Values of x in the table can be searched to make sure that there are no replicas too closely spaced according to whatever criterion is selected.

Figure 8A:
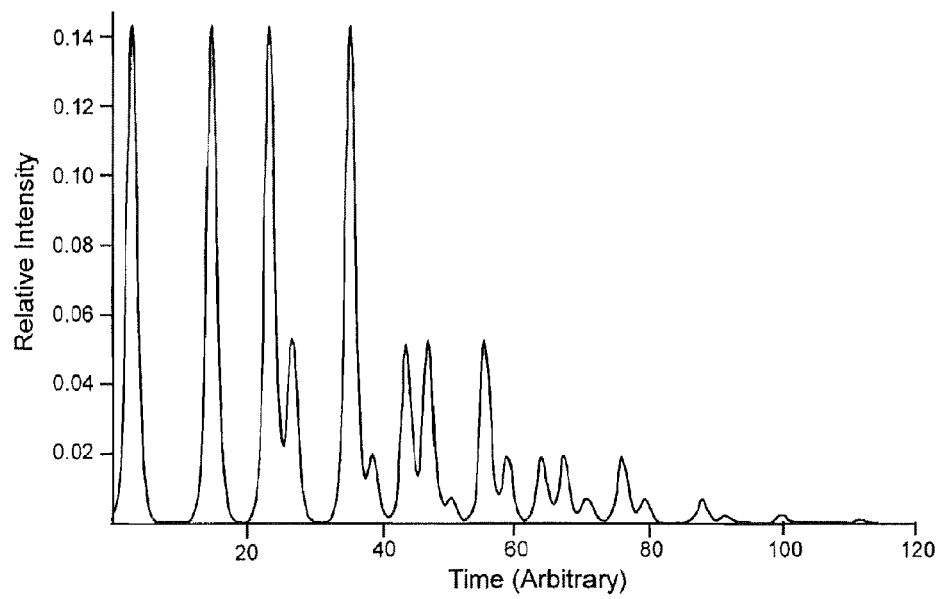
FIG. 8A is a graph schematically illustrating computed relative intensity as a function of time in a burst of replicas of hypothetical sech-squared pulses from the second pulse-stretcher of the apparatus of FIG. 8 wherein the first and second pulse-stretchers each have a delay loop similar to the delay loop of FIG. 2, and wherein the first pulse-stretcher has a round-trip time equal to a pulse-repetition period of the harmonic-wavelength pulses plus seven-times the pulse-duration of the harmonic-wavelength pulses, and the second pulse-stretcher has a round-trip time equal to a pulse-repetition period of the harmonic-wavelength pulses plus twelve-times the pulse-duration of the harmonic-wavelength pulses.

FIG. 8A is a graph schematically illustrating computed relative intensity as a function of time in a burst of replicas at the output of pulse-stretcher 19 with the following assumptions. The replicas are assumed to be "sech squared" pulses. The first pulse-stretcher is assumed to have a round-trip time equal to a pulse-repetition period of the harmonic-wavelength pulses plus seven-times the pulse-duration of the harmonic-wavelength pulses, and the second pulse-stretcher is assumed to have a round-trip time equal to a pulse-repetition period of the harmonic-wavelength pulses plus twelve-times the pulse-duration of the harmonic-wavelength pulses. The beamsplitter reflectivity in each pulse-stretcher is assumed to be 37.85% with round-trip losses of 2% in each pulse-stretcher. The sixth and higher replicas in a burst are neglected and the fifth and higher burst-portions are neglected. A pulse-duration is about 1.7 on the arbitrary time scale. No two pulse-replicas are spaced apart by less than about two pulse-durations.

Figure 8B:
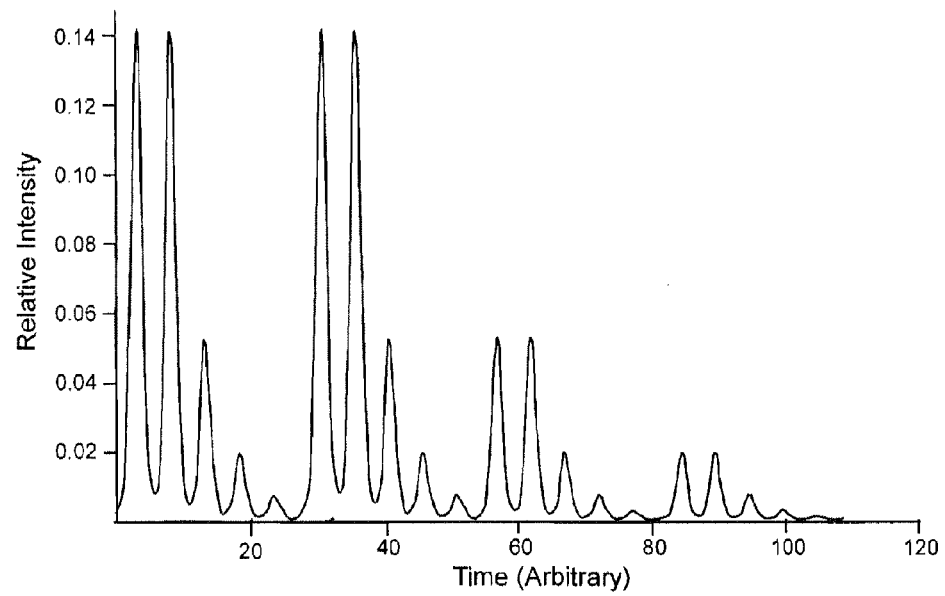
FIG. 8B is a graph schematically illustrating computed relative intensity as a function of time in a burst of replicas of hypothetical sech-squared pulses from the second pulse-stretcher of the apparatus of FIG. 8 wherein the first and second pulse-stretchers each have a delay loop similar to the delay loop of FIG. 2, and wherein the first pulse-stretcher has a round-trip time equal to a pulse-repetition period of the harmonic-wavelength pulses plus three-times the pulse-duration of the harmonic-wavelength pulses, and the second pulse-stretcher has a round-trip time equal to a pulse-repetition period of the harmonic-wavelength pulses plus sixteen-times the pulse-duration of the harmonic-wavelength pulses.

FIG. 8B is a graph schematically illustrating computed relative intensity as a function of time in a burst of replicas at the output of pulse-stretcher 19. Here assumptions are the same as for the graph of FIG. 8 with an exception that the first pulse-stretcher is assumed to have a round-trip time equal to a pulse-repetition period of the harmonic-wavelength pulses plus three-times the pulse-duration of the harmonic-wavelength pulses, and the second pulse-stretcher is assumed to have a round-trip time equal to a pulse-repetition period of the harmonic-wavelength pulses plus sixteen-times the pulse-duration of the harmonic-wavelength pulses.

Figure 9:
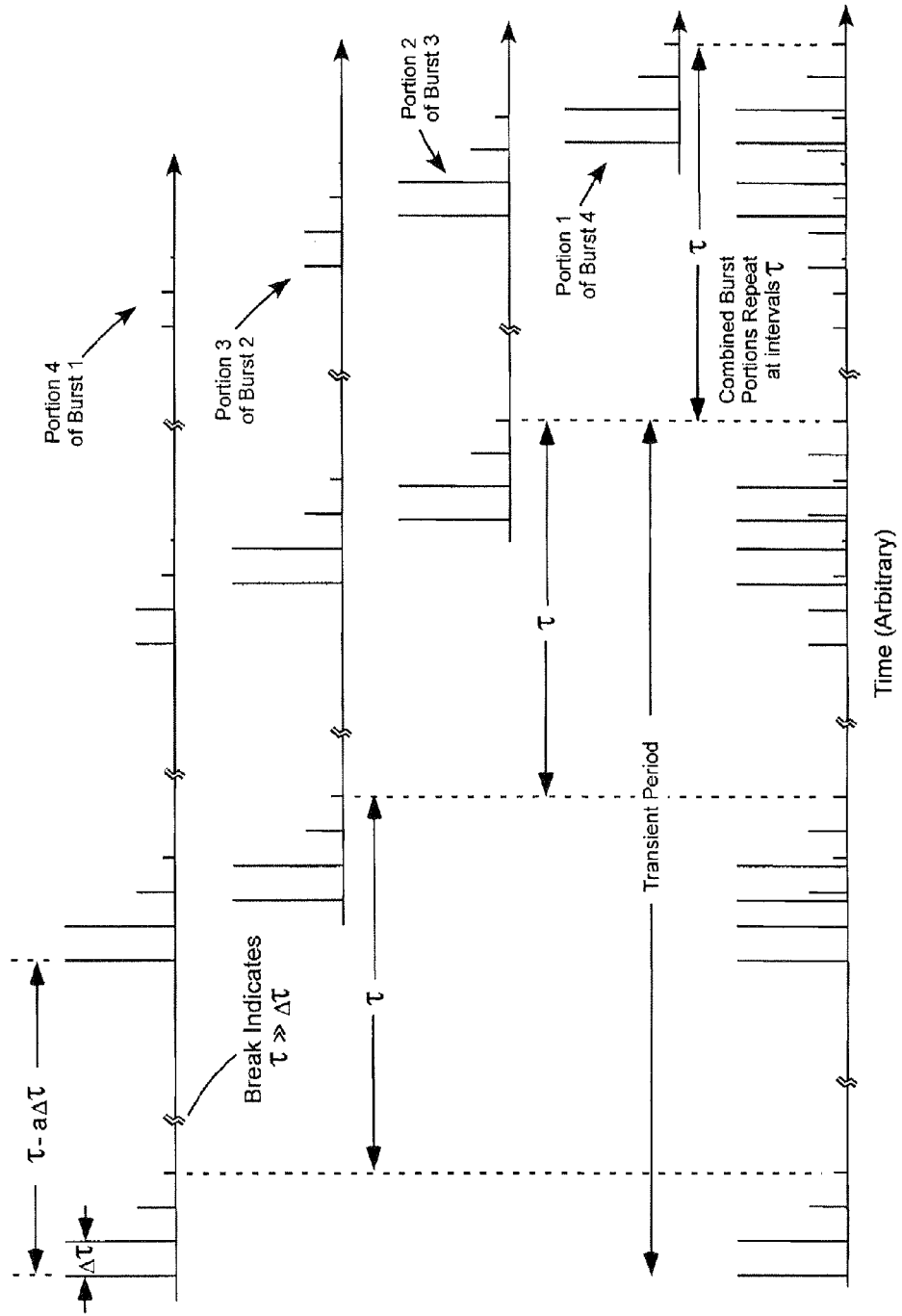
FIG. 9 is a timing diagram schematically illustrating division of bursts of harmonic-wavelength pulses into replicas thereof by an example of the second pulse-stretcher of FIG. 7 including a delay loop similar to the delay loop of FIG. 2 and recombination of replicas of different pulse-replica-bursts into longer bursts, with the first and second delay loops having a round-trip lengths respectively fractionally greater and fractionally less than twice the resonator-length of the mode-locked laser.

FIG. 9 is a timing diagram schematically illustrating division of bursts of harmonic-wavelength pulses into replicas thereof by an example of pulse-stretcher 19 of FIG. 7 including a delay loop similar to the delay loop of FIG. 2. Replicas of different pulse-replica-bursts are combined into longer bursts as described above with reference to FIG. 8. In the timing diagram of FIG. 9, however, the delay loops of pulse-stretchers 16 and 19 are assumed to have round-trip lengths respectively fractionally greater and fractionally less than the round-trip resonator-length L of the mode-locked laser. A result of this is that, in combined burst-portions at the output of pulse-stretcher 19, pulse-replicas having the highest peak-power are located in the center of the combination of bursts with replicas having lower power ahead of and behind these highest-peak-power replicas, as indicated in the bottom line of the timing diagram of FIG. 9.

In the discussion presented above, the importance of avoiding temporal overlap of pulse-replicas is discussed in the context of avoiding interference. In cases where polarization of radiation delivered to a target is not important, it is possible to cause some replicas in a burst thereof to be plane-polarized in a first orientation, and others to be plane-polarized in a second orientation perpendicular to the first orientation. If a pulse-replica plane-polarized in the first orientation temporally overlaps a pulse-replica plane-polarized in the second orientation the replicas will not interfere.

Figure 7A:
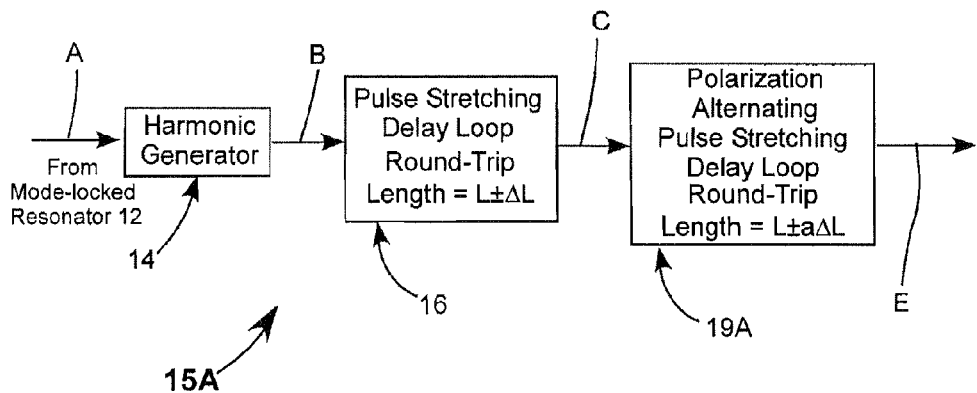
FIG. 7A schematically illustrates a variation of the apparatus of FIG. 7 wherein the second pulse-stretcher alternates the polarization of radiation circulating therein on successive round trips therein.
Figure 7B:
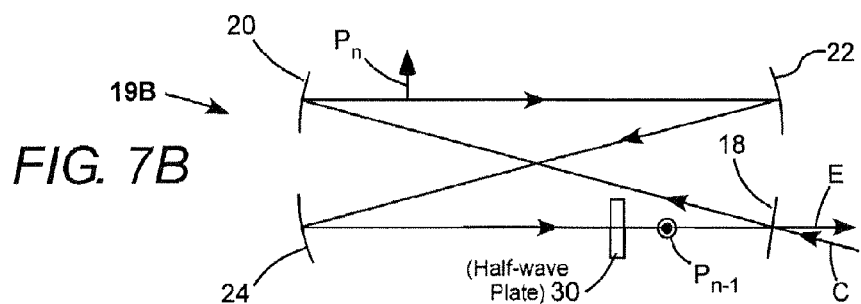
FIG. 7B schematically illustrates a delay loop suitable for the second pulse-stretcher of the apparatus of FIG. 7A, similar to the delay loop of FIG. 2, but including a half-wave plate arranged such that sequential burst-replicas generated in the delay loop are plane-polarized perpendicular to each other.

One means of effecting alternate polarization of replicas is depicted in FIG. 7A. Here a second pulse-stretcher 19A is configured such that the polarization of radiation circulating therein is rotated by 90 degrees on successive round-trips of the delay loop. FIG. 7B schematically illustrates one example 19B of a delay loop for effecting this polarization rotation. Delay loop 19A is similar to the delay loop of FIG. 2 with an exception that a half-wave (at the wavelength of the harmonic-wavelength pulses) plate 30 is included in the path of radiation in the loop. If radiation circulating in the resonator is vertically polarized on a nth round trip as indicated in FIG. 7B by arrow Pn, the radiation will be horizontally polarized on an (n+1)th round trip as indicated by arrowhead $P_{n+1}$.

In this arrangement, it is recommended that the delay loop be configured such that the angle of incidence on beamsplitter 18 be as near normal as is practical. This will minimize the reflectivity difference on the beamsplitter for the different polarization-orientations.

However, at an angle sufficiently different from normal, for example about 45°, a beamsplitter can be designed that has a predetermined polarization-dependence of reflectivity, with this dependence used as an additional variable for tailoring the relative intensity of replicas output by the delay loop.

By way of example, if the beamsplitter in a lossless loop has a reflectivity for the input polarization-orientation of about 29.289% and a reflectivity of about 58.578% for a polarization-orientation perpendicular to the input polarization-orientation, then the first three replicas will have a relative intensity of 0.29289 and the fourth replica and fifth replicas will have a relative intensity of only 0.0502. The sixth replicas will have a relative intensity of about 0.008. There will be about 88% of the input pulse energy in the first three replicas. The peak-intensity in a burst of replicas will be about 25% less than would be the case for an optimized loop without polarization dependence.

For real (lossy) conditions the two reflectivity values ($R_P$ and $R_S$) can be approximated by equations:

$$R_P = \frac{1 + \frac{1}{T} + 2T - \frac{\sqrt{1 + 2T + 5T^2}}{T}}{2(1+T)} \quad (4)$$

and $$R_S = \frac{1 + 3T - \sqrt{1 + 2T + 5T^2}}{2T} \quad (5)$$

where T is 1.0 minus the round trip loss, and $R_P$ has the lower of the two values.

Figure 9A:
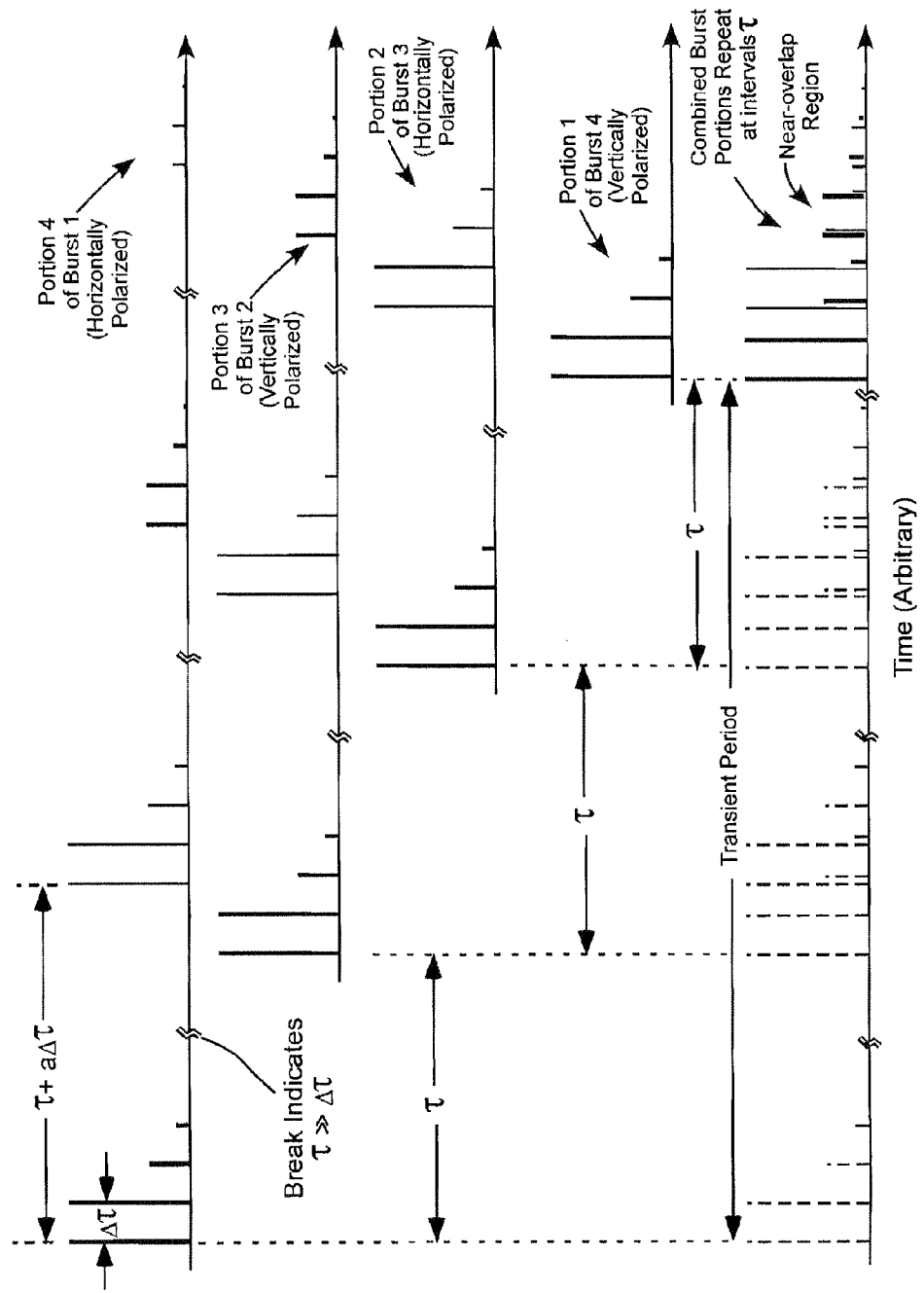
FIG. 9A is a timing diagram schematically illustrating division of bursts of harmonic-wavelength pulses into replicas thereof by an example of the second pulse-stretcher of FIG. 7A including a delay loop similar to the delay loop of FIG. 7B and recombination of horizontally and vertically polarized replicas of different pulse-replica-bursts into longer bursts, with the first and second delay loops each having a round-trip length fractionally greater than twice the resonator-length of the mode-locked laser.

FIG. 9A is a timing diagram schematically illustrating division of bursts of harmonic-wavelength pulses into replicas thereof by an example of the second pulse-stretcher including a delay loop similar to the delay loop of FIG. 7B and recombination of horizontally and vertically polarized replicas of different pulse-replica-bursts into longer bursts. In FIG. 9A, vertically polarized pulse-replicas are designated by bold lines and horizontally-polarized pulse-replicas are designated by fine lines. Odd-numbered portions of pulse-bursts created by the second pulse-stretcher from a burst of pulses received from the first stretcher are assumed to be vertically polarized. Even-numbered burst-portions are assumed to be horizontally polarized. In a burst of replicas at the output of the second-pulse-stretcher the most closely temporally spaced replicas are plane-polarized perpendicular to each other. Those skilled in the art will recognize without further detailed description or illustration that a half-wave plate could be incorporated in the first pulse-stretcher such that odd and even numbered pulse-replicas were plane-polarized perpendicular to each other.

Figure 9B:
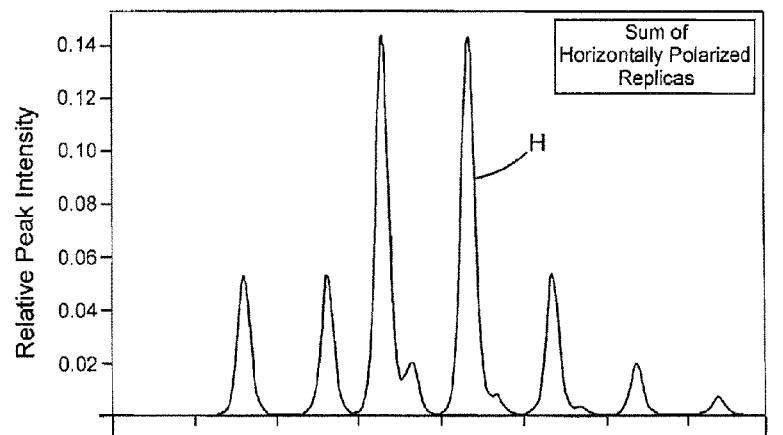
FIGS. 9B-D are graphs schematically illustrating computed relative intensity as a function of time in a burst of replicas of hypothetical sech-squared pulses from the second pulse-stretcher of the apparatus of FIG. 7A wherein the first pulse-stretcher has a delay loop similar to the delay loop of FIG. 2 and the second pulse-stretcher has a delay loop similar to the delay loop of FIG. 7B, and wherein the first pulse-stretcher has a round-trip time equal to a pulse-repetition period of the harmonic-wavelength pulses plus six-times the pulse-duration of the harmonic-wavelength pulses, and the second pulse-stretcher has a round-trip time equal to a pulse-repetition period of the harmonic-wavelength pulses minus five-times the pulse-duration of the harmonic-wavelength pulses.
Figure 9C:
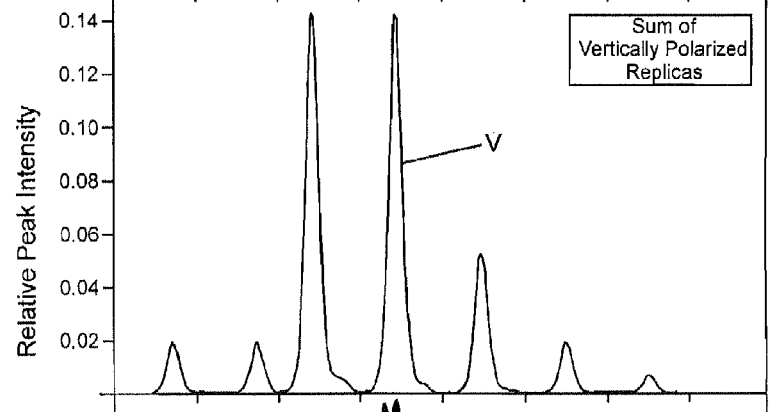
Figure 9D:
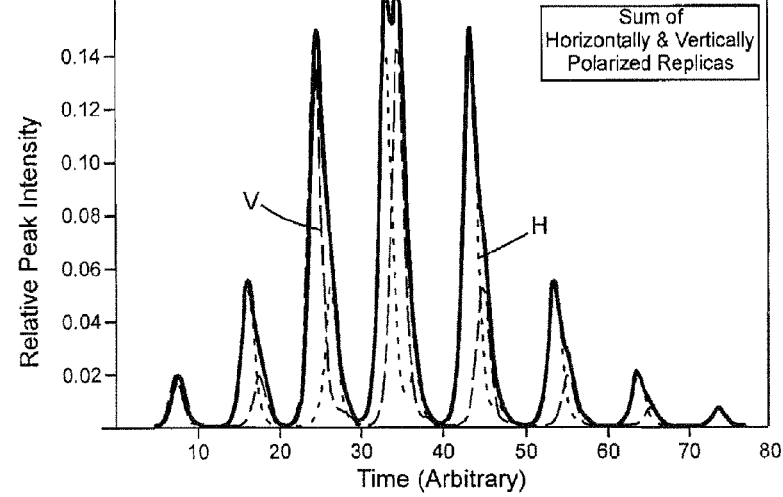

FIGS. 9B-D are graphs schematically illustrating computed relative intensity as a function of time in a burst of replicas of hypothetical sech-squared pulses from the second pulse-stretcher of the apparatus of FIG. 7A wherein the first pulse-stretcher has a delay loop similar to the delay loop of FIG. 2 and the second pulse-stretcher has a delay loop similar to the delay loop of FIG. 7B. The first pulse-stretcher is assumed to have a round-trip time equal to a pulse-repetition period of the harmonic-wavelength pulses plus six-times the pulse-duration of the harmonic-wavelength pulses. The second pulse-stretcher (the polarization alternating stretcher) is assumed to have a round-trip time equal to a pulse-repetition period of the harmonic-wavelength pulses minus five-times the pulse-duration of the harmonic-wavelength pulses. Odd and even numbered burst-portions generated by delay loop 19B are assumed to be respectively vertically and horizontally polarized. The beamsplitter in the polarization alternating stretcher is assumed to have the same reflectivity for each polarization state. Other assumptions are the same as those of the computation of FIG. 8A.

FIGS. 9B and 9C graphically depict respectively the sum of vertically-polarized pulse-replicas and the sum of horizontally polarized replicas (curves V and H respectively) at the output of the second pulse-stretcher. In each case, the temporally closest-spaced pulse-replicas are separated by at least about two pulse-durations and also have very different peak-power, such that the difference between any constructive and destructive interference will be negligible.

FIG. 9D graphically depicts the sum of the horizontally and vertically polarized sums. Here, there are three central peak components formed by temporally overlapping vertical and horizontally polarized components. There will, accordingly, not be any interference in these peaks.

It is evident from the above described examples that arranging two of the inventive pulse-stretchers "cascaded" in optical series, and using available variables such as positive and "negative" delay, different delay values, and overlapping pulse-replicas perpendicular to each other affords significant flexibility in tailoring the temporal energy deposition profile of a replica pulse-burst delivered by the second pulse-stretcher. Additional flexibility is possible by varying the reflectivity of the beamsplitters in the two pulse-stretchers.

In above-described embodiments of the invention, each pulse-stretcher has a round-trip delay that is fractionally different from the round-trip time of radiation in the mode-locked resonator, i.e., fractionally different from a pulse-repetition period $\tau$ of the mode-locked resonator. The fractional difference referred to here is less than a few percent of $\tau$. Variables discussed above can also be used to advantage in embodiments of the present invention wherein the inventive pulse-stretching delay loops have a round-trip delay-time that is fractionally different from a submultiple of the resonator round-trip time $\tau$ ($\tau/N \pm \Delta\tau$, where N is an integer equal to or greater than 2) of the resonator. This is achieved by making the length of a delay loop about equal to $L/N \pm \Delta L$, where L as noted above, is the round-trip optical length of the resonator. In such embodiments the PRF of stretched harmonic-wavelength pulses is N times the PRF of the fundamental-wavelength pulses.

Figure 10:
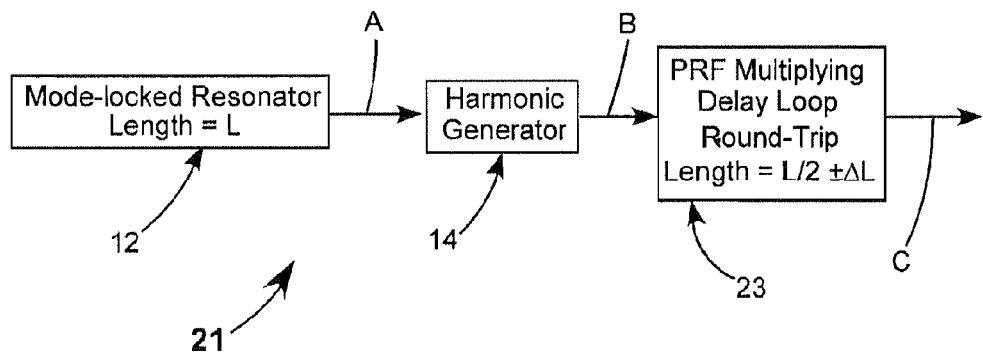
FIG. 10 schematically illustrates yet another preferred embodiment of laser apparatus in accordance with the present invention similar to the apparatus of FIG. 1 but wherein the pulse-stretcher includes an optical delay loop having a round-trip delay time fractionally different from one-half of the pulse-repetition period of the mode-locked resonator.

FIG. 10 schematically illustrates yet another preferred embodiment 21 of laser apparatus in accordance with the present invention that provides stretched harmonic-wavelength pulses at a PRF higher than that of the fundamental wavelength pulses. Apparatus 21 is similar to apparatus 10 of FIG. 1 with an exception that pulse-stretcher 16 of apparatus 10 is replaced in apparatus 21 by a pulse-stretcher 23 that includes a delay loop having a round-trip delay time of $\tau/2 \pm \Delta\tau$, i.e., fractionally different from one-half of the round-trip time $\tau$ of mode-locked resonator 12. The round-trip time of mode-locked resonator 12 is, of course, equal to the pulse-repetition period of the resonator.

Figure 11:
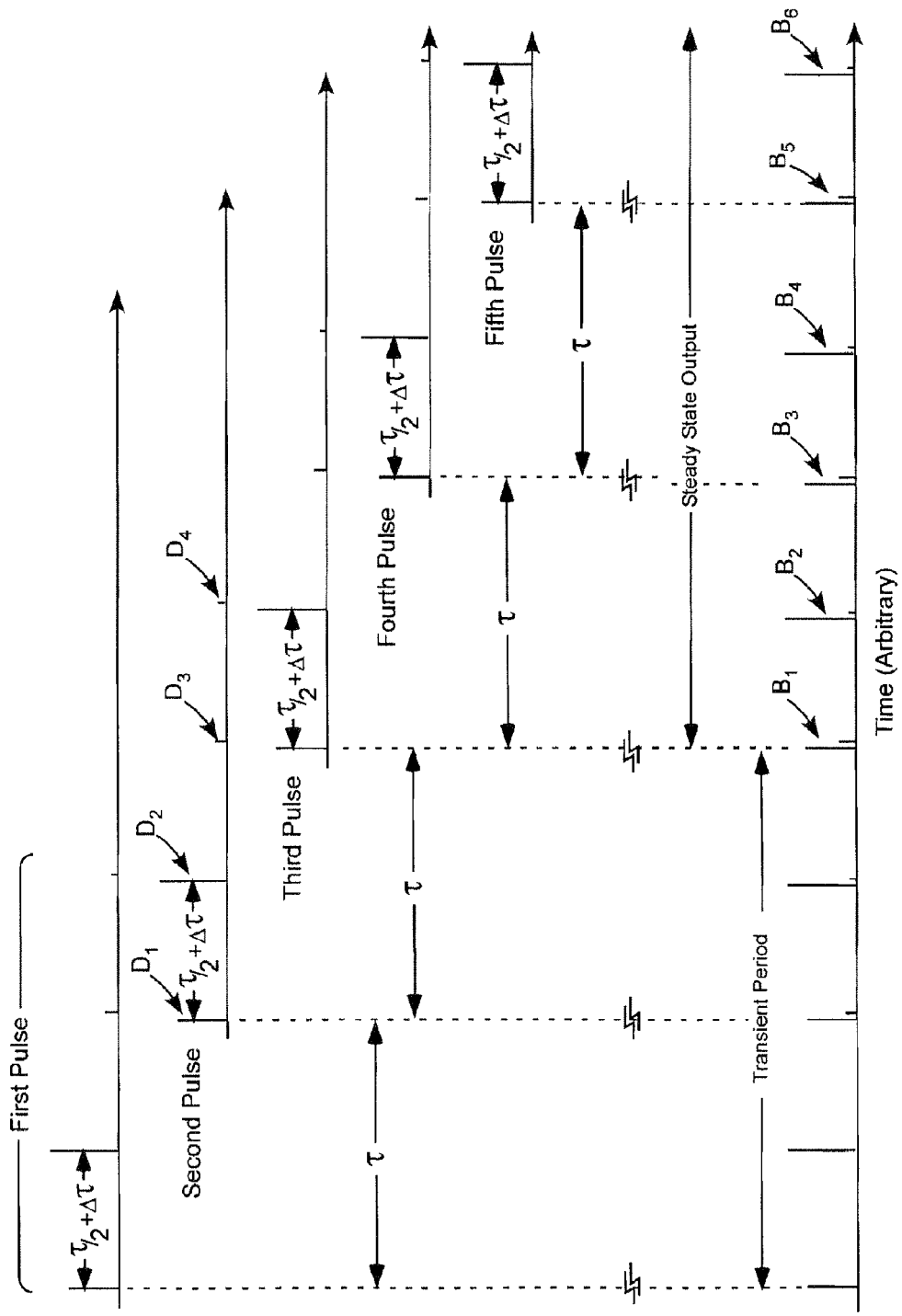
FIG. 11 is a timing diagram schematically illustrating generation of pulse-bursts in an example of the apparatus of FIG. 10.

FIG. 11 is a timing diagram schematically illustrating generation of pulse-bursts in an example of the apparatus of FIG. 10. Pulse-stretcher 23 divides each input pulse into replicas $D_1, D_2, D_3, D_4$, and so forth as discussed above. Here fifth and six replicas have too low a peak-power to be depicted and, accordingly, are neglected. The replicas of any pulse each have a different peak-power. In FIG. 11, the second replica of each pulse has a higher peak-power than the first replica for reasons that are discussed further hereinbelow. The third replica has a lower peak-power than the first replica, and the fourth replica has a lower peak-power than the third replica, as discussed above. The delay loop is assumed to have a round-trip delay time of $\tau/2 + \Delta\tau$, and the replicas of each pulse are temporally spaced by this time-interval. The first replicas of successive pulses are temporally spaced by the pulse-repetition period $\tau$. The steady state output of pulse-stretcher 23, depicted on the bottom line of the timing diagram of FIG. 11 will comprise bursts of pulse-replicas $B_1, B_2, B_3, B_4, B_5$, and so forth, at a burst-repetition frequency that is twice the PRF of mode-locked resonator 12. The bursts of pulse-replicas can be considered as "stretched" pulses repeated at twice the PRF of mode-locked resonator 12. The burst-repetition frequency can be considered as a stretched-pulse-repetition frequency.

In FIG. 11, as the fifth and higher replicas of each pulse are neglected, burst $B_1$ comprises the first replica of the third pulse and the third replica of the second pulse. Burst $B_2$ comprises the second replica of the third pulse and the fourth replica of the second pulse. Burst $B_3$ comprises the first replica of the fourth pulse and the third replica of the third pulse, and burst $B_4$ comprises the second replica of the third pulse and the fourth replica of the second pulse. Burst $B_3$ will actually also comprise the fifth replica (not shown) of the second pulse. Burst B4 will actually also comprise the sixth replica (not shown) of the second pulse. Generally, in the steady state, an $n^{th}$ burst of replicas will comprise only even numbered pulse-replicas and an $(n+1)^{th}$ burst of replicas will comprise only odd numbered replicas, although any replica higher than the sixth will have vanishingly small peak-power, and can be neglected in most cases.

Now, in certain applications, it may be desirable that each burst of pulse-replicas (stretched pulse) have the same energy. This can be achieved by selecting a suitable value for beamsplitter 18 in the delay loop. Recognizing that equation (1) discussed above for computing the intensity of a particular transmitted replica defines a geometric progression having a common ration $R(1-A)$ and a scale factor $(1-A)(1-R)^2$, and defining $T=(1-A)$ the total intensity $I_{ODD}$ of odd-numbered replicas will be given by an equation:

$$I_{ODD} = R + \frac{(1-R)^2 RT^2}{1-R^2T^2} \quad (6)$$

and the total intensity $I_{EVEN}$ of even-numbered replicas will be given by an equation:

$$I_{EVEN} = \frac{(1-R)^2 T}{1-R^2T^2} \quad (7)$$

from which it can be determined that $I_{ODD}$ and $I_{EVEN}$ will be equal when:

$$R = \frac{T}{1+2T} \quad (8)$$

R will be ⅓ (33.333 . . . %) when the round-trip loss is zero (T=1). For a round-trip loss of 2% (T=0.98), R is about 33.108%. By way of example, this provides that the first, second, third, fourth, fifth, and sixth replicas of a pulse have relative peak-power (or peak-intensity) of, about, 0.331, 0.439, 0.142, 0.046, 0.015, and 0.005.

Similarly it can be determined that total loss $L_{TOTAL}$ is given by an equation:

$$L_{TOTAL} = \frac{(1-R)(1-T)}{1-RT} \quad (9)$$

and that the intensity I in each of the equal-energy bursts is given by an equation:

$$I = \frac{R}{1-RT} \quad (10)$$

where in each case R has been determined from equation (8). When T=1 (R=333.3333%) each of the equal energy bursts produced from an input pulse will have 50% of the energy of the input pulse.

In practice it is difficult to obtain, at least from commercial suppliers, beamsplitters having a reflectivity with one or two tenths of a percent of a specified value between about 30% and 40%. In cases where equal burst-energy is of critical importance, it may be found useful to configure beamsplitter 18 such that it has a selectively variable reflectivity. This can be done, for example, by providing a coating having a continuously graded reflectivity (from a value high than a desired value to a value lower than the desired value) over the surface of the beamsplitter, with either an angular or linear gradient, and correspondingly rotating or translating the beamsplitter in the input beam path until equal burst-energy is obtained. A method of producing graded reflectivity coatings is described in U.S. Pat. No. 5,993,904, assigned to the assignee of the present invention, and the complete disclosure of which is hereby incorporated by reference.

Figure 11A:
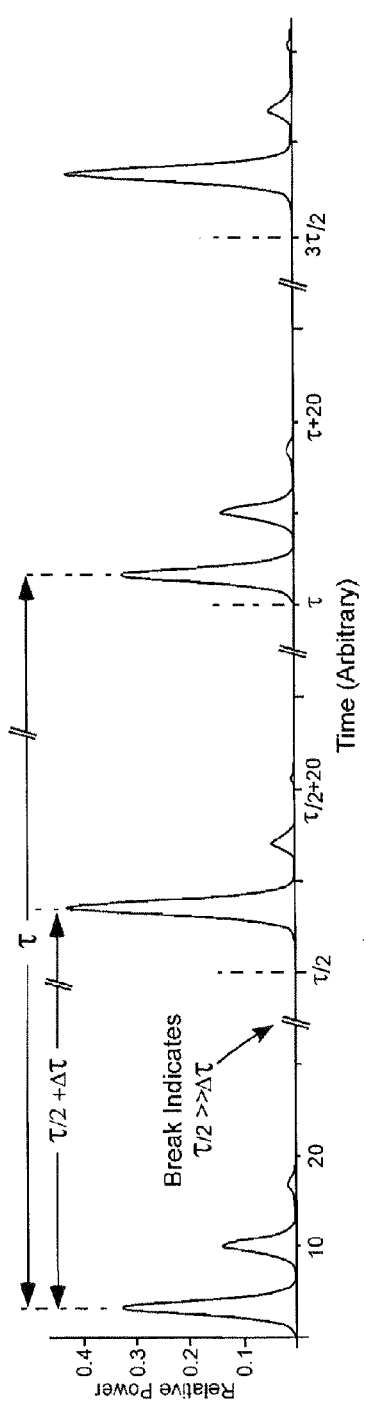
FIG. 11A is a graph schematically depicting detail of relative power as a function of time in four pulse-bursts generated in an example of the pulse-stretcher of FIG. 10.

FIG. 11A is graph schematically illustrating computed relative power as a function of time of a sequence of equal-energy bursts of pulse-replicas from pulse-stretcher 23 in which $\Delta\tau$ is adjusted to provide a spacing of four pulse-durations between replicas. The time axis is greatly foreshortened to allow detail of the pulse-replicas to be depicted. Of note, here, is that while there are two bursts per repetition-period, the bursts are not temporally, exactly equally spaced. The temporal spacing of the bursts alternates between $\tau/2+\Delta\tau$ and $\tau/2-\Delta\tau$. As already noted, however, $\Delta\tau$ will usually be less than about 1% of $\tau$.

Figure 10A:
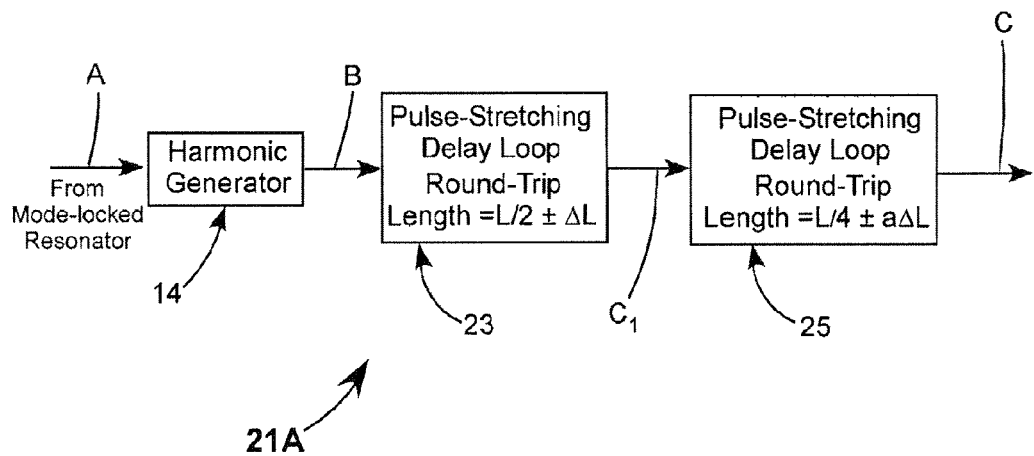
FIG. 10A schematically illustrates still another preferred embodiment of laser apparatus in accordance with the present invention, similar to the apparatus of FIG. 7 but wherein the first pulse-stretcher includes an optical delay loop having a round trip delay time fractionally different from one-half of the pulse-repetition period of the mode-locked resonator, and the second pulse-stretcher includes an optical delay loop having a round trip delay time fractionally different from one-quarter of the pulse-repetition period of the mode-locked resonator.

FIG. 10A schematically illustrates still another preferred embodiment 21A of laser apparatus in accordance with the present invention similar to the apparatus of FIG. 10 but wherein the output of pulse-stretcher 23 is directed along a path $C_1$ into a second pulse-stretcher 25 having a round-trip length $L/4+a\Delta L$ corresponding to a round-trip delay-time $\tau/4+a\Delta\tau$. The action of pulse-stretcher 25 is depicted, in timing diagram form, in FIG. 11B.

Each burst from pulse-stretcher 23 is divided into portions in pulse-stretcher 25. In FIG. 11B, odd-numbered burst-portions are designated $O_1$, $O_2$, $O_3$, and $O_4$, with higher numbered portions $O_5$, $O_6$, and so forth, not visible on the scale of the diagram. Even-numbered burst-portions are designated $E_1$, $E_2$, $E_3$, and $E_4$, again, with higher numbered portions $E_5$, $E_6$, and so forth, also not visible on the scale of the diagram. In the output channel C of pulse-stretcher 25, the bottom line of FIG. 11B, there is a repeated series of four sequences or bursts of pulse-replicas. Each series includes sequences $S_1$, $S_2$, $S_3$, and $S_4$. These are delivered in a time period $\tau$, such that the sequence repetition rate is four-times the pulse repetition rate of the mode-locked resonator. In the steady state, in general terms, $S_1$ comprises the $1^{st}$ portion of the $(n+1)^{th}$ burst from pulse-stretcher 23, the $3^{rd}$ portion of the nth burst, the $5^{th}$ portion of the $(n-1)^{th}$ burst, and so forth. $S_2$ comprises the $2^{nd}$ portion of the $(n+1)^{th}$ burst, the $4^{th}$ portion of the $n^{th}$ burst, the $6^{th}$ portion of the $(n-1)^{th}$ burst, and so forth. $S_3$ comprises the $1^{st}$ portion of the $(n+2)^{th}$ burst, the $3^{rd}$ portion of the $(n+1)^{th}$ burst, the $5^{th}$ portion of the $n^{th}$ burst, and so forth. $S_4$ comprises the $2^{nd}$ portion of the $(n+2)^{th}$ burst, the $4^{th}$ portion of the $(n+1)^{th}$ burst, the $6^{th}$ portion of the $n^{th}$ burst, and so forth.

Figure 11C:
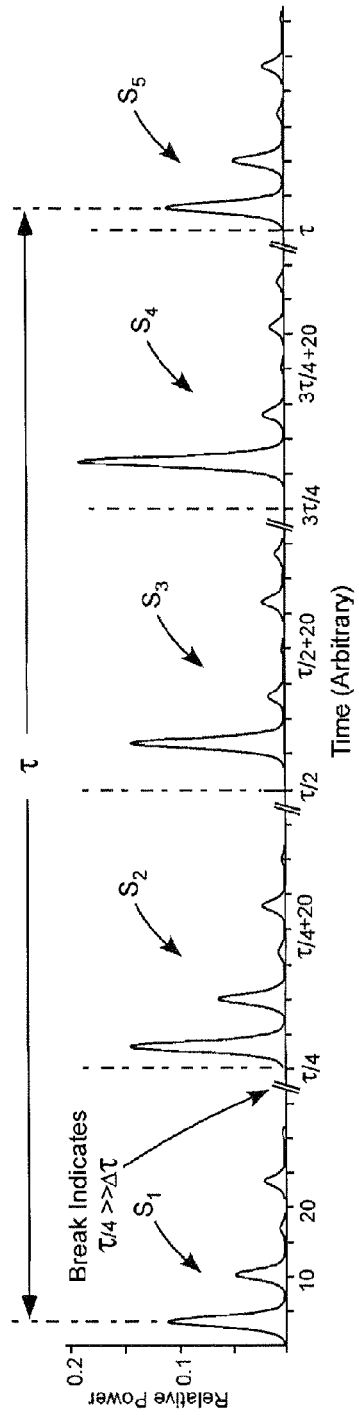
FIG. 11C is a graph schematically depicting detail of relative power as a function of time in five pulse-sequences generated in an example of the second pulse-stretcher of FIG. 10A from equally-energy input bursts from the first pulse-stretcher of FIG. 10A.
Figure 11B:
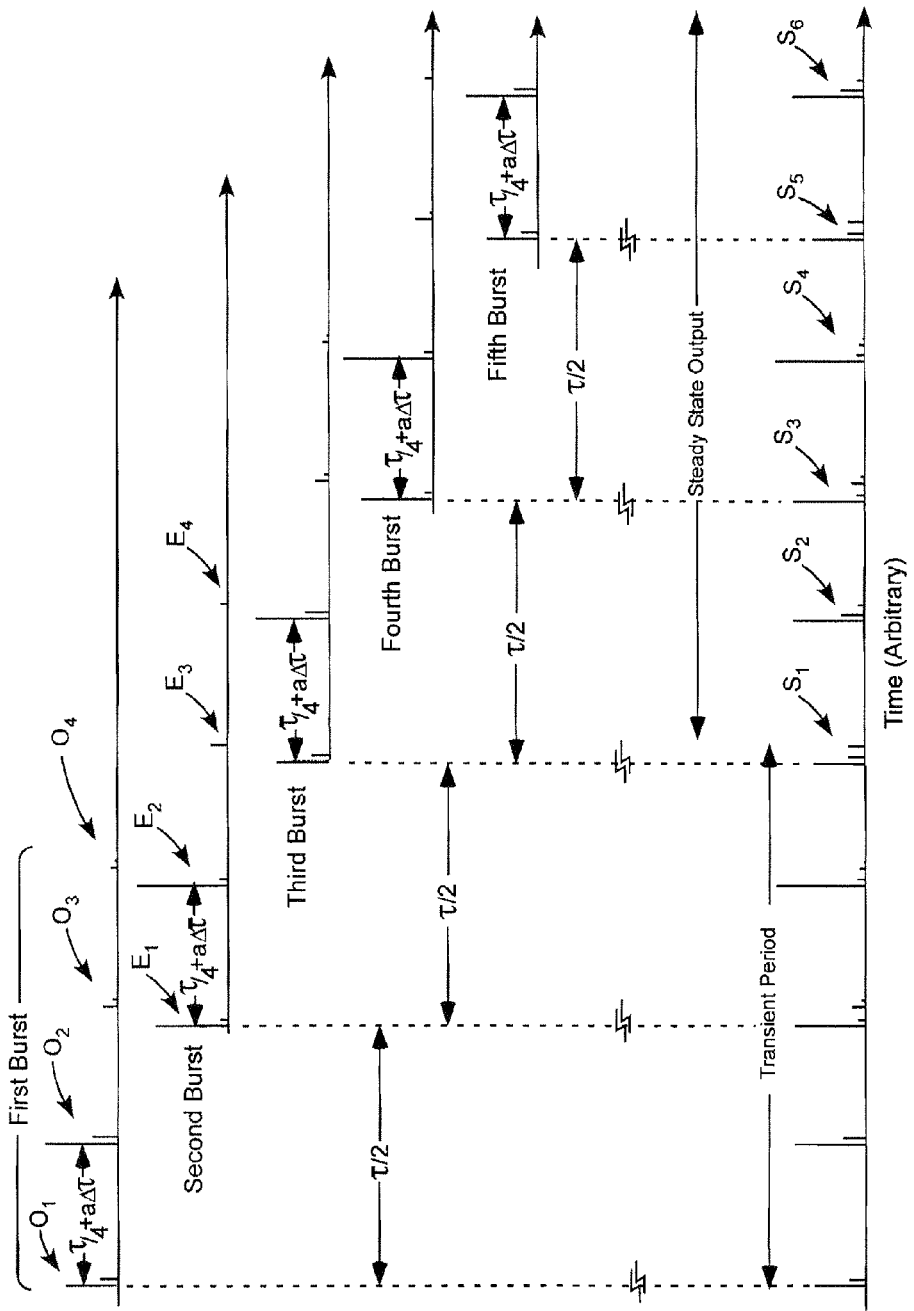
FIG. 11B is a timing diagram schematically illustrating generation of pulse sequences in an example of the apparatus of FIG. 10A.

FIG. 11C is a graph schematically illustrating detail of computed relative power as a function of time for five pulse-sequences in the timing diagram of FIG. 11B. As in FIG. 11A, the time-axis is greatly foreshortened to allow detail of the pulse-replicas to be depicted. It is assumed in this computation that pulse-replicas in the input bursts are spaced apart by Δτ equal to four pulse-durations and that the value aΔτ is sixteen pulse-durations. It is also assumed that the input to pulse-stretcher 25 is replica-bursts of equal energy as discussed above. It is further assumed that the round-trip loss in each of the pulse-stretchers is 0.02, and that the reflectivity of the beamsplitter in each of the pulse-stretchers is about 33.1%, i.e., that value which provides the equal-energy bursts from pulse-stretcher 23. Those having sufficient patience to compute the energy in each of the four sequences $S_1$-$S_4$ will find that each sequence has about the same energy, even though each comprises a different set of replicas from those comprised by any other. As in the case of pulse-stretcher 23, the sequences are not temporally, exactly equally spaced, but can be described as being about equally spaced.

In embodiments of the present invention described above, a prior-art harmonic generator converts fundamental-wavelength pulses delivered by a mode-locked laser-resonator into harmonic-wavelength pulses. These harmonic-wavelength pulses are then stretched in a pulse-stretcher in accordance with the present invention. In a prior-art harmonic generator it is usual to provide optics for focusing radiation beams to be converted into optically nonlinear crystals that perform the conversion. One common way of arranging this focusing is to place an optically nonlinear crystal in a beam-waist position between a pair of lenses forming an optical relay. Set forth below is a description of embodiments of apparatus in accordance with the present invention in which the prior-art harmonic generator and relay optics thereof are dispensed with, and optically nonlinear crystals for performing frequency conversion are included in relay imaging pulse-stretchers in accordance with the present invention in which there are, incidentally, two beam waist positions located between concave mirrors selected for the relay imaging.

Figure 12:
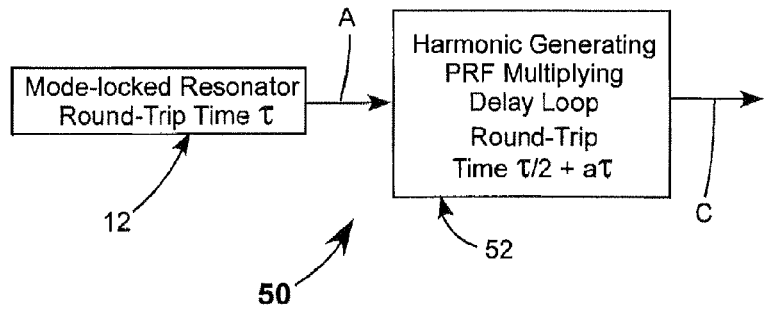
FIG. 12 schematically illustrates still yet another preferred embodiment of laser apparatus in accordance with the present invention schematically including a mode-locked resonator having a resonator round-trip time $\tau$ and delivering optical pulses having a fundamental wavelength at a pulse-repetition period, and a harmonic generator for converting the fundamental-wavelength pulses delivered by the laser-resonator to harmonic-wavelength pulses, with the harmonic generator including an optical delay loop configurable for dividing the harmonic-wavelength pulses into replicas thereof and combining the replicas into bursts of replicas, and optionally providing the bursts of replicas at a burst-repetition period that is a fraction of the pulse-repetition period of the fundamental pulses.

FIG. 12 schematically illustrates still yet another preferred embodiment 50 of laser apparatus in accordance with the present invention schematically including a mode-locked resonator 12 having a resonator round-trip time τ and delivering optical pulses having a fundamental wavelength. Resonator 12 delivers optical pulses at a pulse-repetition period τ equal to the round-trip time of the resonator. The PRF of pulses delivered by the resonator is 1/τ.

Figure 13:
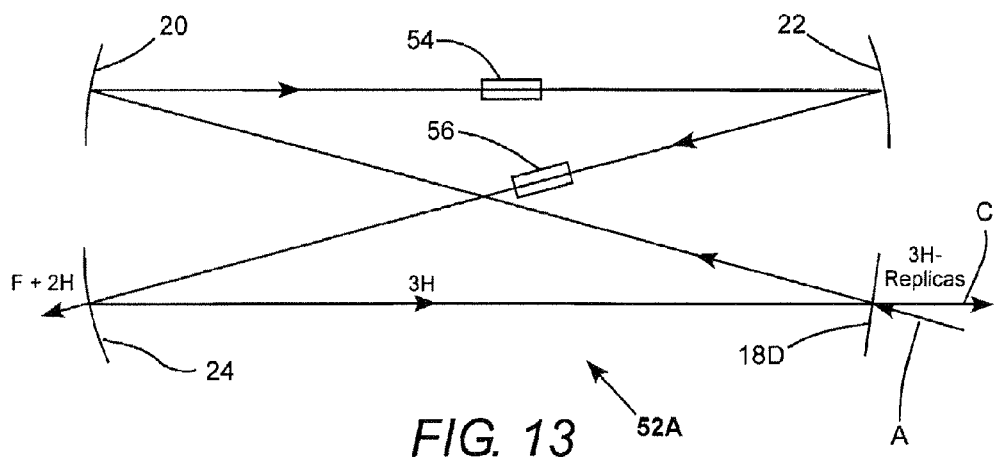
FIG. 13 schematically illustrates one example in accordance with the present invention of a delay loop suitable for use in the apparatus of FIG. 12, similar to the delay loop of FIG. 2 but including two optically nonlinear crystals arranged to generate, within the delay loop, a third-harmonic-wavelength pulse from a fundamental-wavelength pulse.

Pulses from resonator 12 are delivered along path A to an inventive PRF-multiplying harmonic-generator 52 for converting the fundamental-wavelength pulses delivered by the laser-resonator to harmonic-wavelength pulses. The PRF-multiplying harmonic generator includes an optical delay loop, one example 52A of which is depicted in FIG. 13. Delay loop 52A is configured similarly to delay loop 16A of FIG. 2 but includes a second-harmonic (2H) generating optically nonlinear crystal 54 in a beam-waist position between concave mirrors 20 and 22, and another optically nonlinear crystal 56 at a beam-waist position between concave mirrors 22 and 24. Optically nonlinear crystal 56 may be arranged to generate third-harmonic (3H) radiation from 2H-radiation generated by crystal 54 and residual fundamental (F) radiation residual from the 2H-radiation. Crystal 56 may also be arranged to convert 2H-radiation generated by crystal 54 into fourth-harmonic (4H) radiation. It is assumed in the continuing description that crystal 56 is a 3H-generating crystal.

Fundamental wavelength pulses enter delay loop 52A via beamsplitter 18D. Beamsplitter 18D is optically coated such that it transmits as much as possible of the fundamental radiation but is partially reflective and partially transmissive for the 3H-radiation. The input fundamental pulse circulates in the loop in the direction indicated in FIG. 13A by the arrows. Mirror 20, here, is coated to be highly reflective for the fundamental radiation and highly reflective for the 3H radiation. Mirror 22, here, is coated to be highly reflective for the fundamental, 2H and 3H-radiations. Mirror 24, here, is coated to be highly reflective for the 3H-radiation and highly transmissive for the fundamental (F) radiation and 2H-radiation.

After passage through the optically nonlinear crystal 56, the injected fundamental pulse has generated a corresponding 3H-pulse (about 355 nm-wavelength for a fundamental-wavelength of 1064 nm). Fundamental and 2H-radiation leave delay loop 52A via mirror 24 thereof. The 3H-pulse however can only leave the mirror by making repeated round-trips in the delay loop, with a replica portion of the pulse exiting on each incidence of the circulating 3H radiation on beamsplitter 18D. The output of delay-loop 56 will be similar to that of PRF-multiplying pulse-stretcher 23 of FIG. 10 and replicas of successive input pulses can be combined into bursts in a similar manner.

A disadvantage of this embodiment is that there is no practical value of reflectivity for beamsplitter 18D that will provide that sequential burst of pulse-replicas delivered from delay loop will have equal energy, as is possible in the arrangement of FIGS. 10 and 10A. A beamsplitter reflectivity of about 50% will provide that the energy in sequential bursts is in a ratio of about 2:1. This may be tolerable in certain applications.

Figure 14:
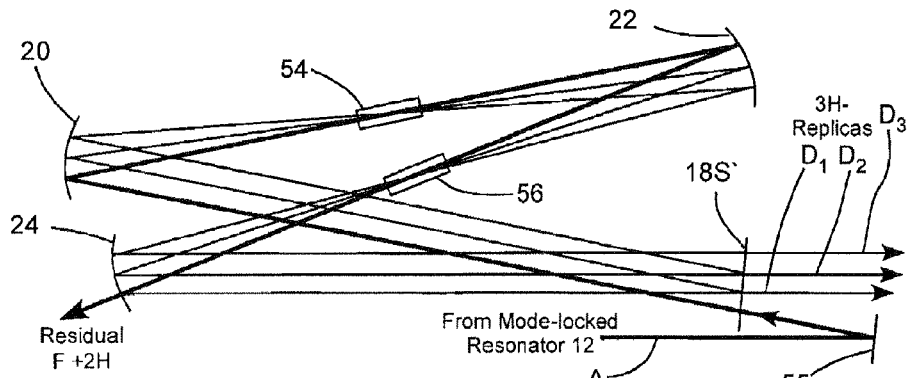
FIG. 14 schematically illustrates an example in accordance with the present invention of a harmonic-generating delay loop similar to the delay loop of FIG. 4 but including two optically nonlinear crystals arranged to generate a third-harmonic-wavelength pulse from a fundamental-wavelength pulse.

It is possible of course to include optically nonlinear crystals in a delay loop of the type depicted in FIG. 4. Such an arrangement is schematically illustrated in FIG. 14. Here a 1:1 relay imaging delay loop similar to delay loop 17A of FIG. 4 is reconfigured such that the beam waist position between mirrors 22 and 24 is not in the path of beams propagating from input beamsplitter 18S' to mirror 20. Beamsplitter 18S' is configured similarly to beamsplitter 18S of delay loop 17A with an exception that the stepping or grading of reflectivity on the beamsplitter is different. A pulse from mode-locked laser 12 enters delay loop 53 (here, via a turning mirror 55) along path A. The path of this pulse is depicted by a bold line. Optically nonlinear crystals 54 and 56, having the function described above with reference to delay loop 52A of FIG. 13 are aligned on this path in the delay loop. The crystals are located at beam-waist positions as described above.

After the input pulse has passed through the crystals and a 3H-pulse is generated by crystal 56, residual fundamental (F) radiation of the input pulse and 2H-radiation residual from the 2H-generating and 3H-generating processes is allowed to exit delay loop 53 via mirror 24 thereof. The 3H-pulse is incident on beamsplitter 18S' at a point thereon having a reflectivity of about 66.7%, about a third of the 3H-pulse is transmitted out of the delay loop along path $D_1$. The reflected portion of the 3H-pulse makes a round trip in the loop and is incident on beamsplitter 18S' at a point thereon where the reflectivity is about 50%. Here, about another third of the 3H-pulse is transmitted out of the delay loop along path $D_2$. After this second reflection, the remainder of the 3H-pulse makes another round trip and is incident on beamsplitter 18S' at a point thereon where the reflectivity is about zero (an antireflection coated portion). Here, the final third of the 3H pulse is transmitted out of the delay loop along path $D_3$.

In this manner, three temporally equispaced replicas of a 3H-pulse of about equal peak-power are transmitted out of the delay loop for each input pulse. If the delay loop has a round-trip time that is about a submultiple of the pulse-repetition period of the mode-locked input pulses bursts of replicas will be delivered from the delay loop at a burst-repetition rate that is a corresponding multiple of the PRF of the mode-locked resonator.

Figure 15:
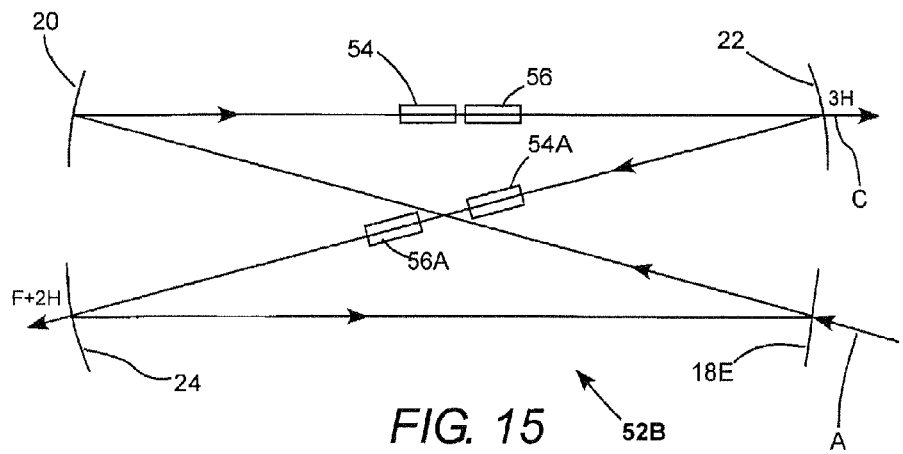
FIG. 15 schematically illustrates another example of a delay loop in accordance with the present invention suitable for use in the apparatus of FIG. 12, the delay loop being similar to the delay loop of FIG. 13 but including a further two optically nonlinear crystals arranged to generate a second third-harmonic-wavelength pulse from fundamental and second-harmonic radiation residual from generation of the first third-harmonic wavelength pulse in the first two optically nonlinear crystals.

FIG. 15 schematically illustrates one example 52B of a delay loop suitable for use in the apparatus of FIG. 12, similar to the delay loop of FIG. 13 but including a further two optically nonlinear crystals 54A and 56A arranged to generate a second third-harmonic wavelength pulse from fundamental radiation residual from generation of the first third harmonic-wavelength pulse in optically nonlinear crystals 54 and 56. Crystals 54 and 56 are located in a beam waist position between mirrors 20 and 22. Crystals 54A and 56A are located in a beam waist position between mirrors 22 and 24. Mirror 22, here, is coated to be highly reflective for fundamental and 2H-radiations and highly transmissive for 3H-radiation. Mirror 18E is highly transmissive for fundamental-wave length radiation and highly reflective for 3H-radiation After a first 3H pulse is generated by crystals 54 and 56, the 3H-pulse, together with residual fundamental and 2H-pulses, is incident on mirror 22. The first 3H-pulse is transmitted out of the delay loop via mirror 22. The 2H-pulse and the residual fundamental pulse are reflected from mirror 22 and a portion thereof is converted to a second third-harmonic pulse in crystals 54A and 56A. Residual fundamental and 2H-radiation from the conversion process in crystals 54A and 56A exits delay loop 52B via mirror 24. The second third harmonic pulse reflected from mirrors 24 and 18E, is transmitted by crystals 54 and 56, and leaves the delay loop via mirror 22 along path C. Accordingly the PRF of 3H-pulses in path C is twice the PRF of the fundamental pulses entering delay loop 52B, although the temporal spacing of sequential ones of the 3H-pulses, in the example depicted, will not be equal.

It is possible to arrange crystals 54 and 56 and 54A and 56A such that the two 3H-pulses generated by the passage of a single fundamental-wavelength pulse through the delay loop have about equal power. This can be done, for example by configuring crystals 54 and 56 such that phase matching for one or both of the crystals is less than optimum, whereby conversion efficiency of the crystals is less than optimum. Crystals 54A and 56A can be configured for optimum conversion efficiency. Reducing the conversion efficiency of crystals 54 and 56 can also be effected by making the length of the crystals less than optimum, or by slightly misaligning the crystal axes with respect to the polarization-plane of input radiation.

Figure 16:
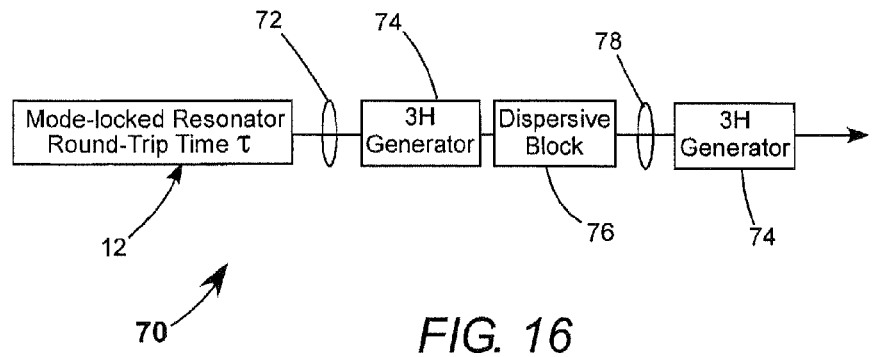
FIG. 16 schematically illustrates one additional preferred embodiment of laser apparatus in accordance with the present invention including a mode-locked resonator delivering optical pulses having a fundamental wavelength at a pulse-repetition period, sequentially through first and second third-harmonic generator modules.

FIG. 16 schematically illustrates one additional preferred embodiment of laser apparatus 70 in accordance with the present invention. Apparatus 70 includes a mode-locked laser 12 delivering fundamental wavelength pulses. Each of fundamental wavelength pulses is focused by a lens 72 into a third-harmonic (3H) generator 74 including two optically nonlinear crystals (not shown). A first 3H-pulse is generated by third-harmonic generator 74. The first 3H-pulse, together with residual fundamental wavelength and 2H-radiation pulses from the 3H-generation process, simultaneously enter a block 76 of dispersive transparent material, such as fused silica. The length of the block is selected such that refractive index dispersion of the material of the block causes a temporal separation of the 3H-pulses and the residual fundamental-wavelength pulse of about one pulse-duration or greater. By way of example, in fused silica, a block length of about 15 centimeters (cm) would be necessary to provide a 15-picosecond separation between 1064 nm fundamental radiation and 355 nm 3H-radiation. The temporally separated fundamental and 3H-pulses are refocused by a lens 78 into a second 3H-generator 74 including two-optically nonlinear crystals (not shown).

The first 3H-pulse is transmitted by the crystals with minimal loss, and the residual fundamental pulse generates a second 3H-pulse, traveling on a common path with the first 3H-pulse, but temporally separated therefrom by one pulse-duration or greater. The harmonic-generator efficiencies can be arranged, as discussed above, such that the first and second 3H-pulses have about the same intensity. As they are temporally relatively close, the first and second 3H-pulses can be considered as a single "stretched" 3-H pulse. Such stretched 3H-pulses will be delivered at the PRF of the fundamental-wavelength pulses from laser 12.

In theory at least, more than two harmonic generators can be cascaded to provide more than two 3H-pulses from every fundamental-wavelength pulse. Between sequential harmonic generators, however, there must be a dispersive block provided to temporally separate residual fundamental-wavelength pulses from the last-generated 3H-pulse. In practice, it will probably be impractical to cascade more than three harmonic generators. Although apparatus 70 is described in terms of generating 3H-pulses, the apparatus may be operated with harmonic generators generating second-harmonic, or fourth or higher harmonic-pulses. Again, however, there must be a dispersive block provided between successive generators such that one particular harmonic-wavelength pulse does not temporally overlap another.

Figure 17:
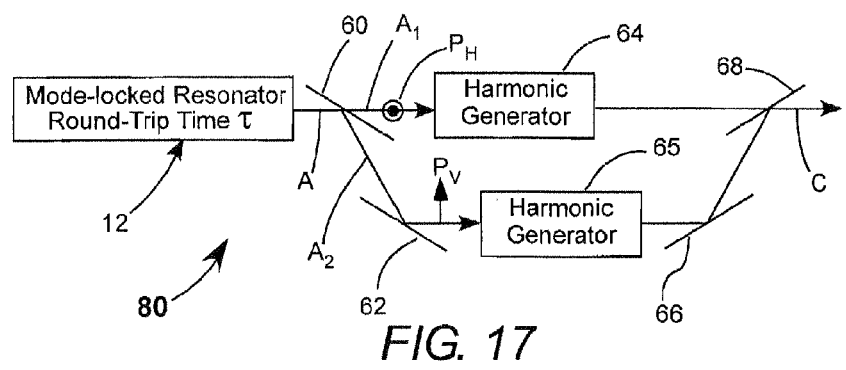
FIG. 17 schematically illustrates one additional preferred embodiment of laser apparatus in accordance with the present invention including a mode-locked resonator delivering optical pulses having a fundamental wavelength at a pulse-repetition period, a beamsplitter dividing each of the fundamental-wavelength pulses into first and second replicas thereof, the first and second replicas following respectively first and second optical paths of first and second different lengths through respectively first and second harmonic generators, with the output of the harmonic generators being combined along a common path by a beam combiner.

FIG. 17 schematically illustrates one additional preferred embodiment 80 of laser apparatus in accordance with the present invention. Apparatus 70 includes a mode-locked laser-resonator 12 as discussed above. Laser-resonator 12 delivers optical pulses along path A to a polarizing (at the wavelength of the pulses) beamsplitter 60. Beamsplitter 60 divides each of the fundamental-wavelength pulses into first and second replicas thereof. The first replica, here horizontally plane-polarized as indicated by arrowhead $P_H$, follows a path $A_1$ to a harmonic generator 64. The second replica, here, vertically plane-polarized as indicated by arrowhead $P_V$, follows a path $A_2$ via a turning mirror 62, to a harmonic generator 65. The harmonic generators can be configured to generate second, third fourth or higher harmonic-wavelength pulses. Harmonic-wavelength pulses from generator 65 are recombined via a turning mirror 66 and a polarizing beam-combiner 68 along a common path C. The harmonic-wavelength pulses generated from any one fundamental-wavelength pulse are temporally spaced apart by selecting different lengths for paths $A_1$ and $A_2$ though the harmonic generators to beam combiner 68. These harmonic generators may be of any prior-art configuration and may also be generators in accordance with the present invention, incorporated in an optical delay loop for pulse stretching or PRF-multiplying, similar to those described above.

The present invention is described above in terms of several particular embodiments. Certain embodiments are arranged to generate individual harmonic-wavelength pulses at a PRF higher than that of fundamental-wavelength pulses from which the harmonic pulses are generated embodiments. Other embodiments are arranged to deliver bursts of harmonic pulse-replicas with temporal separation of pulses in the burst being only a relatively small fraction of the temporal separation of the pulses bursts. Those skilled in the art may devise other embodiments of the present invention combining features from the above described embodiments with out departing from the spirit and scope of the present invention. Accordingly it is emphasized that the present invention is not limited to the embodiments described and depicted herein. Rather, the invention is limited only by the claims appended hereto.

What is claimed is:

1. Laser apparatus comprising:
   a laser-resonator arranged to deliver fundamental-wavelength optical pulses having a pulse-duration, the fundamental-wavelength optical pulses being temporally equispaced by a pulse-repetition period $\tau$ and delivered at a pulse-repetition frequency (PRF) equal to $1/\tau$; and an optical delay loop including one or more optically non-linear crystals and arranged to receive the fundamental-wavelength optical pulses, the optical delay loop being configured and arranged such that each fundamental-wavelength pulse is converted within the optical delay loop into a harmonic-wavelength pulse and further arranged to convert each of the harmonic-wavelength into a plurality of replicas thereof, with the replicas of each harmonic-wavelength pulse being temporally spaced apart by about $\tau/N$ where N is an integer equal to or greater than 2.

2. The apparatus of claim 1, wherein the replicas of each harmonic-wavelength pulse are temporally spaced apart by $\tau/N \pm \Delta\tau$, where $\Delta\tau$ is about equal to or greater than the pulse-duration of fundamental-wavelength optical pulses, the optical delay loop being further arranged to deliver bursts of the harmonic-wavelength pulse-replicas at a burst-repetition frequency equal to the PRF of the fundamental-wavelength optical pulses multiplied by N, with each burst including replicas of different ones of the harmonic-wavelength optical pulses.

3. The apparatus of claim 2, wherein the optical delay loop is configured such that the replicas in each burst thereof are delivered along a common path.

4. The apparatus of claim 2, wherein the delay loop is configured such that the number of replicas in each burst thereof is predetermined and is further configured such that each of the replicas in a burst thereof is delivered along separate path, with the separate replica-paths being spaced apart and parallel to each other, and such that each of the replicas in a burst has about the same intensity.

5. An optical delay loop for receiving pulses of laser light at a first wavelength comprising:

a plurality of mirrors, wherein a first of said mirrors is partially transmissive to said first wavelength and arranged to receive the pulses of light, said mirrors being positioned to circulate the light pulses about a loop; and at least one non-linear crystal within the loop for converting the first wavelength of light to a second wavelength and wherein either said first mirror or a second mirror is partially transmissive to the second wavelength whereby the pulses of second wavelength laser light are divided into a plurality of pulse replicas exiting the loop through said mirror which is partially transmissive to said second wavelength.

6. An optical delay loop as recited in claim 5, wherein said first mirror is partially transmissive to both the first and second wavelengths.

7. An optical delay loop as recited in claim 5, wherein the pulses of laser light input into the delay loop are equispaced by a pulse-repetition period $\tau$ and delivered at a pulse-repetition frequency (PRF) equal to $1/\tau$ and wherein the pulse replicas exiting the loop are temporally spaced apart by about $\tau/N$ where N is an integer equal to or greater than 2.

8. An optical delay loop as recited in claim 5, wherein the pulse replicas exiting the delay loop are temporally spaced apart by $\tau/N \pm \Delta\tau$, where $\Delta\tau$ is about equal to or greater than the pulse duration of the pulses entering the delay loop.

9. The apparatus of claim 5, wherein the pulses replicas exit the delay loop along a common path.

10. A method of converting the wavelength of light of pulses in a train of pulses of laser light having a first wavelength and a first repetition rate and reducing the peak power of the converted pulses while substantially maintaining the average power of the train of converted pulses, said method comprising the steps of:

directing the train of pulses into a delay loop, said delay loop having at least one non-linear crystal therein, said crystal for converting the first wavelength light into second wavelength light; and generating a plurality of replica pulses of second wavelength light which exit the delay loop in a train having a higher pulse repetition rate than the first repetition rate and wherein the pulses have a lower peak power than the initial pulses in the train.

11. A method as recited in claim 10, wherein the delay loop includes a plurality of mirrors and wherein one of said mirrors is partially transmissive to said first wavelength and acts as the input to the delay loop.

12. A method as recited in claim 11, wherein said one mirror is also partially transmissive to the said second wavelength and acts as the output of the delay loop.

13. A method as recited in claim 10, wherein the initial optical pulses in the train are equispaced by a pulse-repetition period $\tau$ and delivered at a pulse-repetition frequency (PRF) equal to $1/\tau$ and wherein the pulse replicas are temporally spaced apart by about $\tau/N$ where N is an integer equal to or greater than 2.

14. A method as recited in claim 13, wherein the pulse replicas are temporally spaced apart by $\tau/N \pm \Delta\tau$, where $\Delta\tau$ is about equal to or greater than the pulse duration of the initial optical pulses in the train.

15. A method as recited in 10, wherein the pulse replicas exit the delay loop along a common path.

* * * * *